US009533542B2

(12) United States Patent
Allen et al.

(10) Patent No.: US 9,533,542 B2
(45) Date of Patent: Jan. 3, 2017

(54) EXTERNALLY ADJUSTABLE SHOCK ABSORBING AND SUSPENSION APPARATUS AND METHOD OF USE

(71) Applicant: Elite Suspension Systems, LLC, Atlanta, GA (US)

(72) Inventors: Mark M. Allen, Atlanta, GA (US); Nicholas C. Giannopoulos, Canton, GA (US)

(73) Assignee: ELITE SUSPENSION SYSTEMS, LLC, Atlanta, GA (US)

( * ) Notice: Subject to any disclaimer, the term of this patent is extended or adjusted under 35 U.S.C. 154(b) by 0 days.

(21) Appl. No.: 14/540,206

(22) Filed: Nov. 13, 2014

(65) Prior Publication Data

US 2015/0165861 A1    Jun. 18, 2015

Related U.S. Application Data

(63) Continuation-in-part of application No. 13/028,348, filed on Feb. 16, 2011, now Pat. No. 8,899,560.

(51) Int. Cl.
| | |
|---|---|
| *B60G 17/08* | (2006.01) |
| *B60G 15/12* | (2006.01) |
| *F16F 9/44* | (2006.01) |
| *F16F 9/06* | (2006.01) |
| *B60G 17/06* | (2006.01) |

(52) U.S. Cl.
CPC .............. *B60G 17/08* (2013.01); *B60G 15/12* (2013.01); *B60G 17/06* (2013.01); *F16F 9/063* (2013.01); *F16F 9/44* (2013.01); *B60G 2202/322* (2013.01)

(58) Field of Classification Search
CPC ................ F16F 9/06; F16F 9/062; F16F 9/08; F16F 9/088; F16F 9/446; F16F 9/466; B60G 17/06; B60G 17/08; B60G 15/12
See application file for complete search history.

(56) References Cited

U.S. PATENT DOCUMENTS

| | | |
|---|---|---|
| 3,554,387 A | 1/1971 | Thornhill et al. |
| 4,796,732 A | 1/1989 | Kong |

(Continued)

FOREIGN PATENT DOCUMENTS

| | | |
|---|---|---|
| CN | 1135583 | 11/1996 |
| CN | 201090649 | 7/2008 |
| CN | 201507592 | 6/2010 |

*Primary Examiner* — Vishal Sahni
(74) *Attorney, Agent, or Firm* — Withers & Keys, LLC

(57) ABSTRACT

A springless shock absorbing and suspension apparatus and method of operation are disclosed that use external adjustments to alter flow resistance through a valve block in the apparatus. The valve block may have throughholes and/or passageways that allow fluid to flow in the valve block. Cover or shim elements may be used relative to certain throughholes and/or passageways to restrict flow in one or both directions. In one example, adjusters may be deployed that vary the force applied to cover or shim elements that effect a change in flow resistance of the valve block. In another example, adjusters may be deployed that articulate or rotate disc rings elements relative to the valve block to modify the effective size of flow openings (e.g., throughholes and/or passageways) that effect a change in flow resistance of the valve block. Separate external adjusters may be used for compression and expansion operations.

18 Claims, 25 Drawing Sheets

(56) References Cited

U.S. PATENT DOCUMENTS

| | | | |
|---|---|---|---|
| 4,807,860 A * | 2/1989 | Simons | B62K 25/08 |
| | | | 188/280 |
| 5,028,037 A | 7/1991 | Wang | |
| 5,133,434 A | 7/1992 | Kikushima et al. | |
| 5,259,487 A | 11/1993 | Petek | |
| 5,996,746 A * | 12/1999 | Turner | F16F 9/43 |
| | | | 188/269 |
| 6,615,960 B1 * | 9/2003 | Turner | F16F 9/062 |
| | | | 188/286 |
| 2009/0277736 A1 * | 11/2009 | McAndrews | F16F 9/096 |
| | | | 188/314 |

* cited by examiner

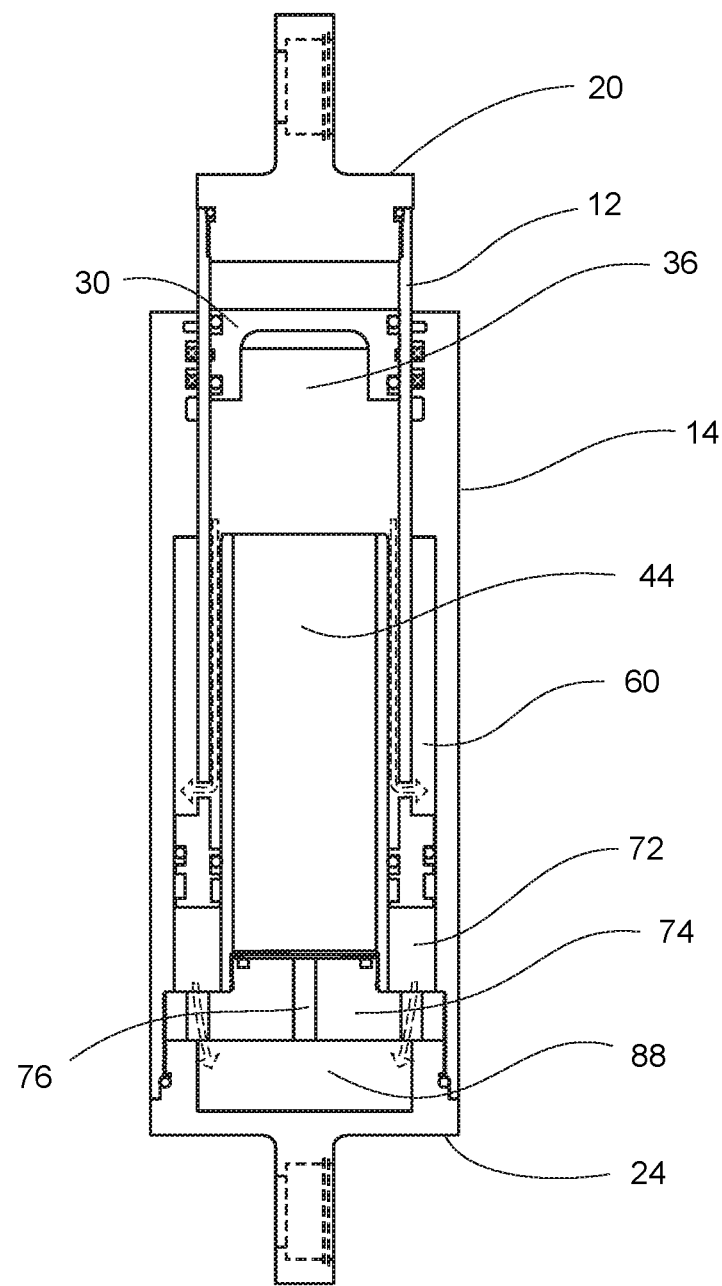
FIG. 5A - COMPRESSED

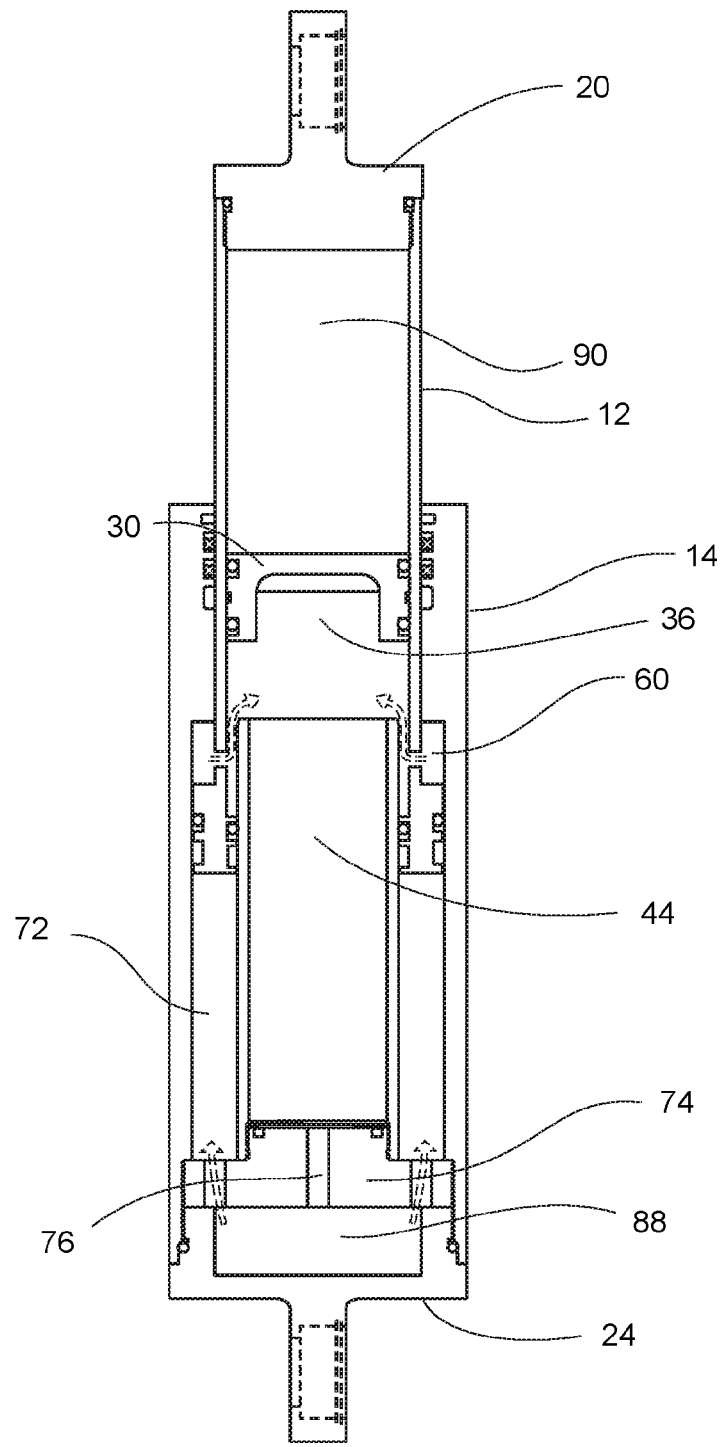
FIG. 5B - EXPANDED

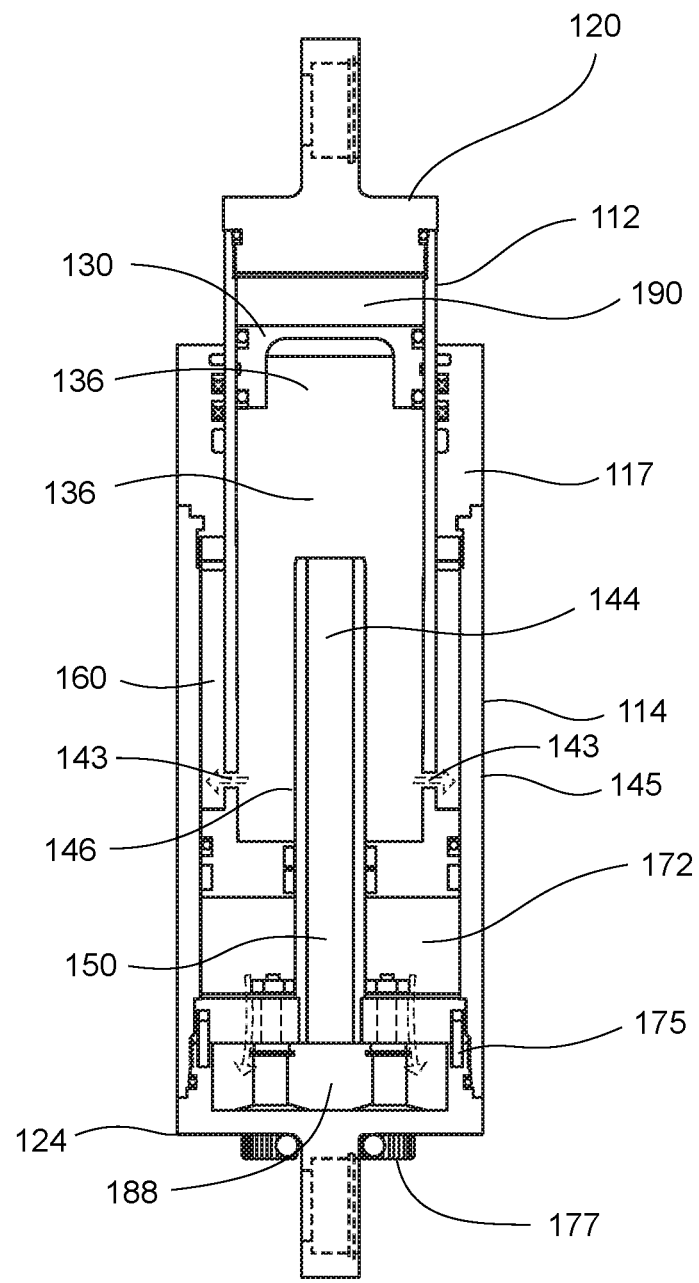
FIG. 6A - COMPRESSED

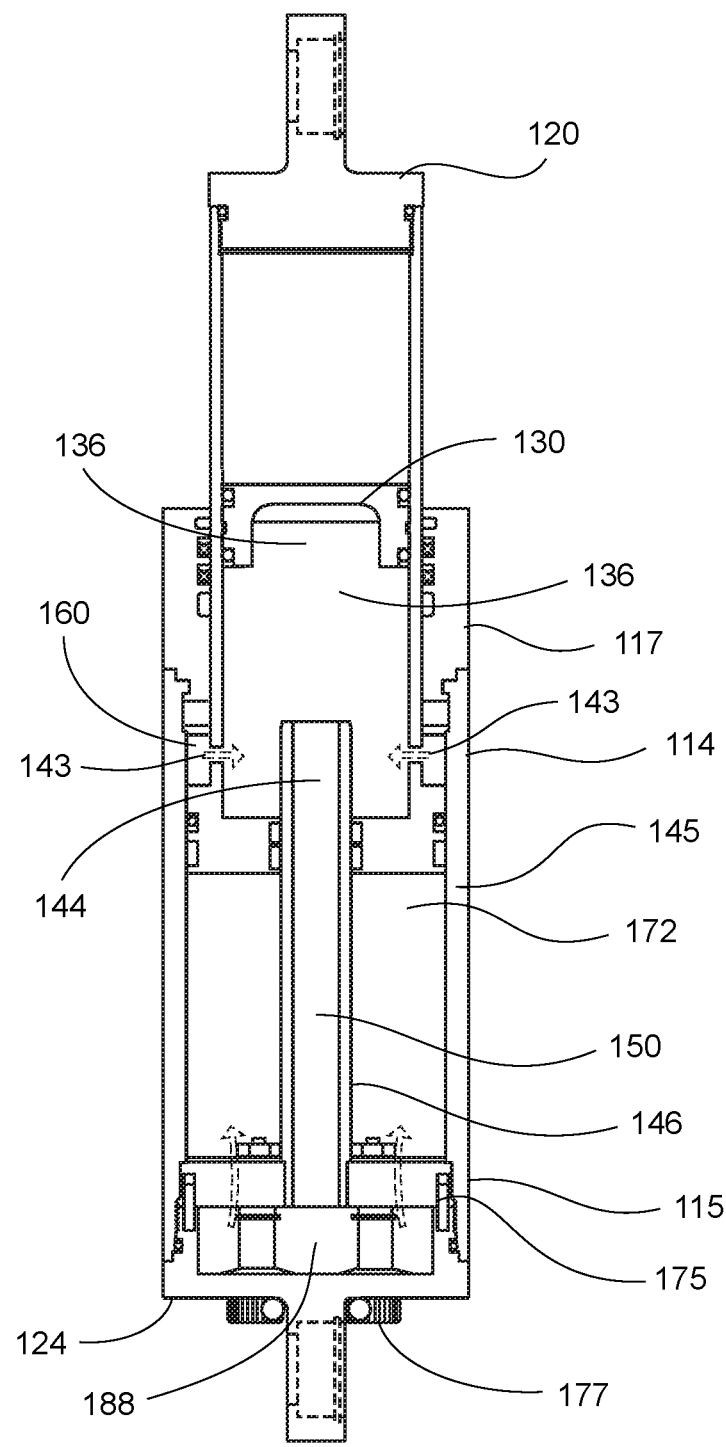
FIG. 6B - EXPANDED

EXTERNALLY ADJUSTABLE SHOCK ABSORBING AND SUSPENSION APPARATUS AND METHOD OF USE

FIELD OF THE DISCLOSURE

The present disclosure relates to generally to shock absorbers for vehicles, and more specifically, to an externally adjustable shock absorber.

BACKGROUND

A shock absorber or damper is a mechanical device designed to smooth out or damp shock impulse, and dissipate kinetic energy. Most shock absorbers (dampers) are utilized with external springs (coils).

Various devices for absorbing shock for vehicles have been attempted utilizing a piston rod moving up and down in a cylinder to provide oscillation dampening ("twin-tube" configuration) therewithin to provide smoothing of shocks that would otherwise be passed to the vehicle. Other shock absorbers utilize a floating piston which accommodates the volume of the piston rod as it moves in an out of a cylinder ("mono-tube" configuration). Such devices typically rely upon springs, most typically coil springs disposed around the body of the shock absorber, or in another location of the suspension, to carry the load of the vehicle. In one prior device a spring is required to internally control a valving operation, wherein fluid within the body of the shock absorber flows in an opposing direction to the motion of the floating piston back through a two-way valve, as gas in the gas chamber decompresses or compresses in response to external circumstances, and pressure in the fluid chamber lessens or increases to restore equilibrium within the system. However, the load is only partially sustained by the compressed gas therewithin and thus the device is effectively non-load-bearing without a spring working in concert.

It is further desirable that a shock absorber be capable of being adjusted to provide the desired "ride" characteristics. This is also important in making a shock absorber that can be adapted to a variety of vehicles. One device approaches this problem by teaching a shock absorber with an adjustable lock-out valve and two stage flow restriction. This suspension/shock combination device works in part by having fluid flow from a fluid chamber into another chamber during the compression and rebound strokes of a piston. The fluid flow is controlled through valves that can be manipulated externally to open and close on demand. By adjusting the opened and closed positions of the valves (or an intermediate position between opened and closed) fluid flow could be increased or decreased and therefore shock absorption characteristics are affected. This device is a damper only for lightweight vehicles such as bicycles. Further, this device does not support the vehicle's weight.

Yet another device teaches pneumatic connections for vehicle suspensions, but comprises a damper only. This device includes a piston inside a housing, wherein separate first and second chambers are also disposed. The piston includes at least one aperture, which regulates the flow of dampening fluid between the two chambers, having an affiliated actuator attached. Upon activation of the actuator, the piston aperture will be obstructed, thereby reducing fluid flow immediately. Deactivation of the actuator will once again permit free fluid flow. Further a frit restricts flow of fluid to assist in dampening shock impact.

Another device teaches a telescopic suspension device for vehicles having two liquid chambers interconnected by a conduit in which a valve unit is interposed. This device has a valve-within-tube structure. Flow of fluid is directly between outer tube and piston (or inner) tube. There is no stationary tube. Further, the valve body is located on the piston tube and thus moves with the piston tube. However, this device lacks adjustment control, although it does provide springless operation.

In another design, the damping tube is threaded to the bottom of the outer tube and the valve is externally threaded on the damping tube. This device requires that the damper tube have holes therein, and further requires a spring to support the vehicle. As an option, this device comprises a port that can be drilled on the outside of the damping tube, to fill same with gas so in extension the gas creates a negative biasing effect. However, no biasing effect is created in compression.

Most dampers in the market (either twin tube configuration or mono-tube configuration) have a gas chamber area, and, in the case of the mono-tube configuration, a floating piston. However, the gas chamber's purpose is not to provide spring action but is rather a place to accommodate the extra oil displaced by the piston rod as it moves down (compression). In another words, the force created in the gas chamber is not enough to sustain the vehicle's weight; hence, the need for an external spring for such dampers. The flow valve located at the end of the piston rod regulates the flow, hence, the damping.

Therefore, it is readily apparent that there is a need for a shock absorber that can provide the necessary operation range of damping motion without requiring that a spring be utilized in combination to support the load of a vehicle, and that further provides a biasing effect in both compression and extension.

SUMMARY

In the following description, certain aspects and embodiments will become evident. It should be understood that the aspects and embodiments, in their broadest sense, could be practiced without having one or more features of these aspects and embodiments. It should be understood that these aspects and embodiments are merely exemplary.

One aspect of the disclosure relates to a springless shock absorbing and suspension apparatus that uses external adjustments to alter flow resistance through a valve block in the apparatus. In general, the valve block may have throughholes and/or passageways that allow fluid to flow in the valve block. Cover or shim elements may be used relative to certain throughholes and/or passageways to restrict flow in one or both directions. In one example, adjusters may be deployed that vary the force applied to cover or shim elements that effect a change in flow resistance of the valve block. In another example, adjusters may be deployed that articulate or rotate disc rings elements relative to the valve block to modify the effective size of flow openings (e.g., throughholes and/or passageways) that effect a change in flow resistance of the valve block. Separate external adjusters may be used for compression and expansion operations.

Other aspects of the disclosure relate to a method of operation where the external adjusters may be selectively actuated to restrict particular passageways or alter the force applied to a cover or shim element. The selective actuation of one external adjuster may be performed to effect an improved performance with compression operations of the shock absorbing apparatus while selective actuation of another external adjuster may be performed to effect an improved performance with rebound operations of the shock absorbing apparatus.

Additional advantages of this and other aspects of the disclosed embodiments and examples will be set forth in part in the description which follows, and in part will be obvious from the description, or may be learned by practice of the invention. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments according to one or more principles of the invention and together with the description, serve to explain one or more principles of the invention. In the drawings.

FIG. 5A is a cross-sectional view of the shock absorber of FIGS. 1A and 1B shown compressed from shock impact in accordance with an embodiment of the invention;

FIG. 5B is a cross-sectional view of the shock absorber of FIGS. 1A and 1B shown expanded after recovery from shock impact in accordance with an embodiment of the invention;

FIG. 6A is a cross-sectional view of the shock absorber of FIGS. 2A and 2B shown compressed from shock impact in accordance with an embodiment of the invention;

FIG. 6B is a cross-sectional view of the shock absorber of FIGS. 2A and 2B shown expanded after recovery from shock impact in accordance with an embodiment of the invention;

DESCRIPTION OF THE EMBODIMENTS

Figure 1A:
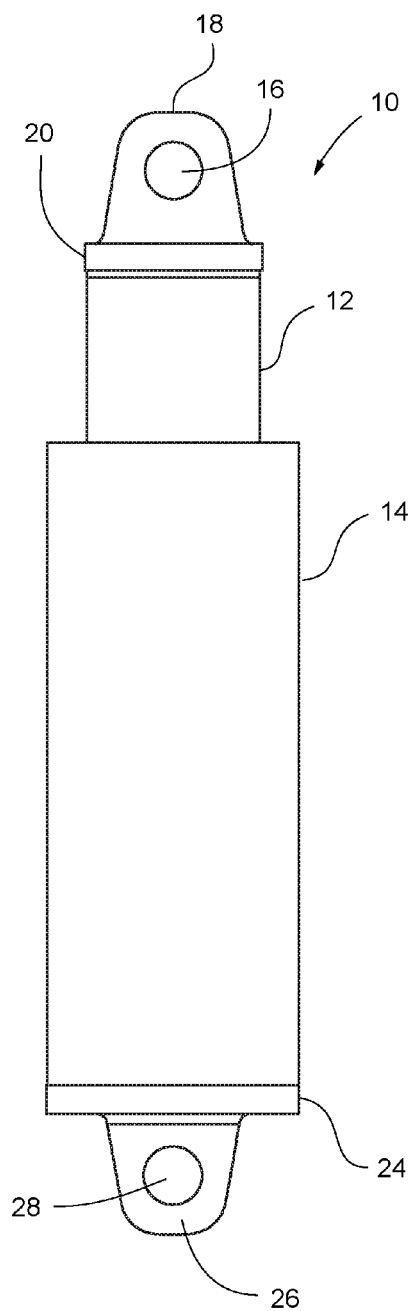
FIG. 1A is a front view of a shock absorber in accordance with an embodiment of the invention.
Figure 1B:
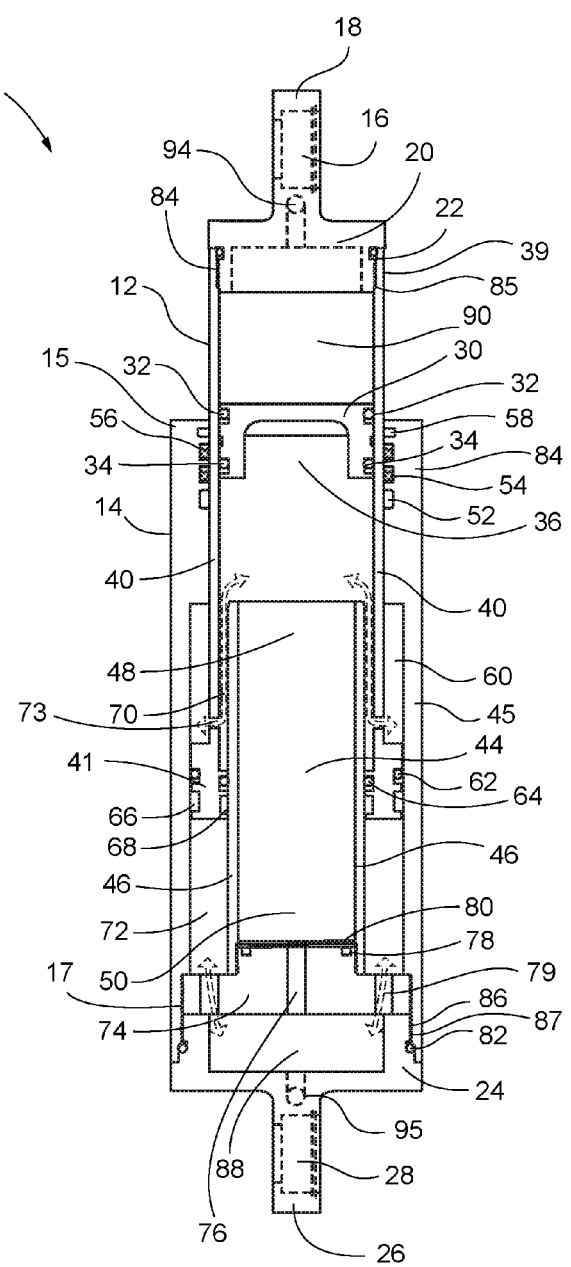
FIG. 1B is a cross-sectional view of the shock absorber of FIG. 1A in accordance with an embodiment of the invention.
Figures 2A, 2B:
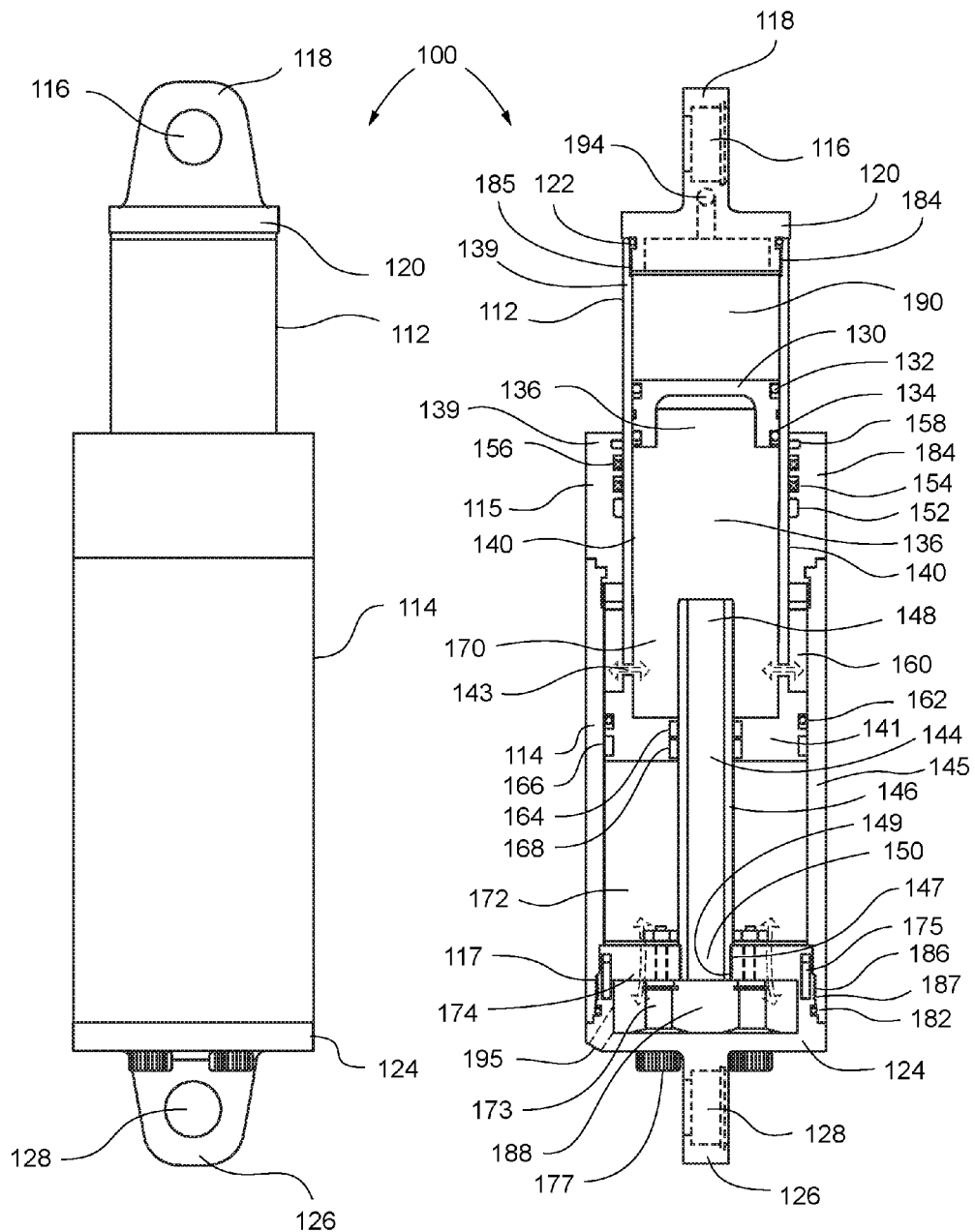
FIG. 2A is a front view of a shock absorber in accordance with an embodiment of the invention.
FIG. 2B is a cross-sectional view of the shock absorber of FIG. 2A in accordance with another embodiment of the invention.
Figure 3:
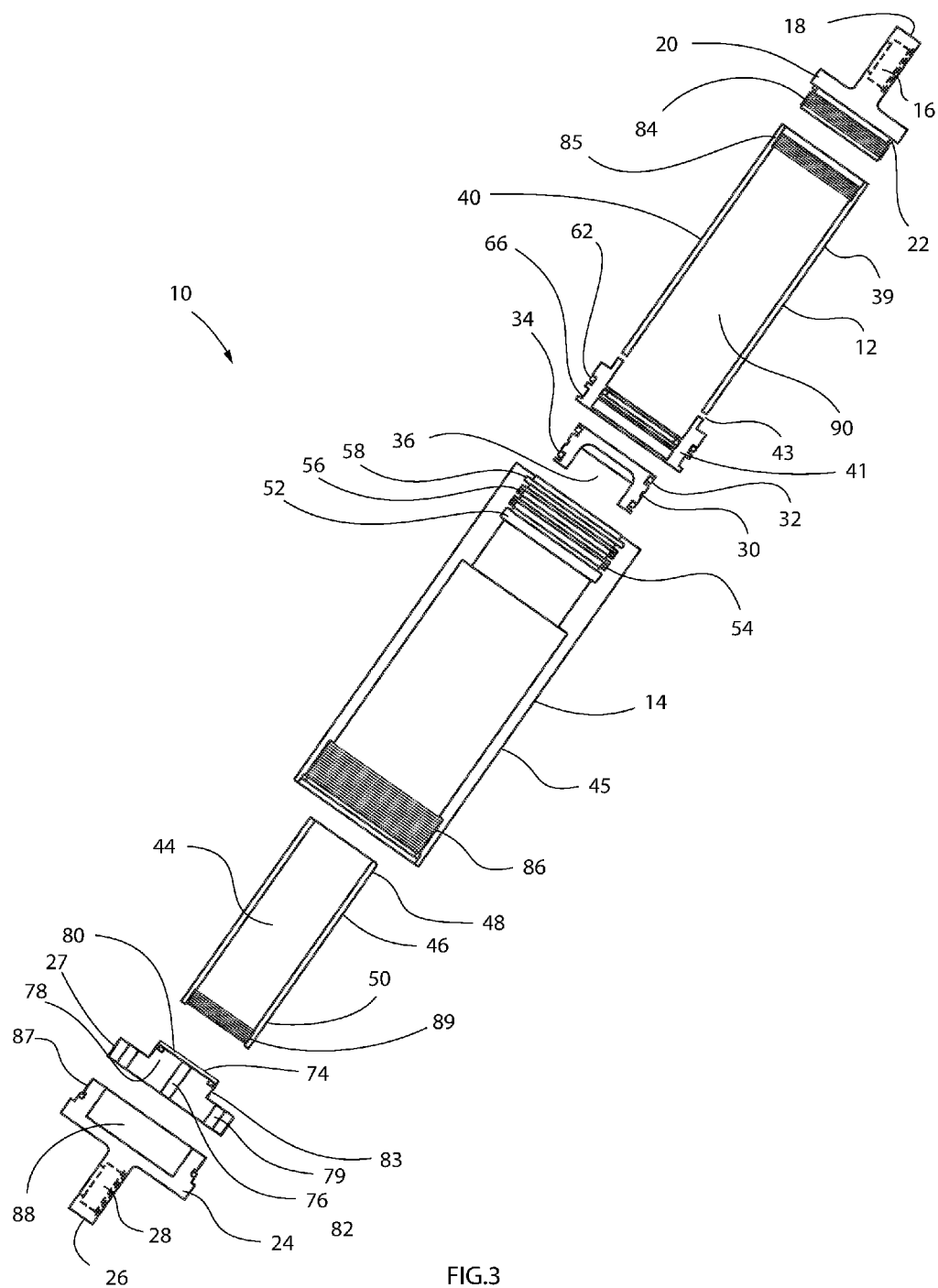
FIG. 3 is an exploded view of the shock absorber of FIGS. 1A and 1B in accordance with an embodiment of the invention.
Figure 4:
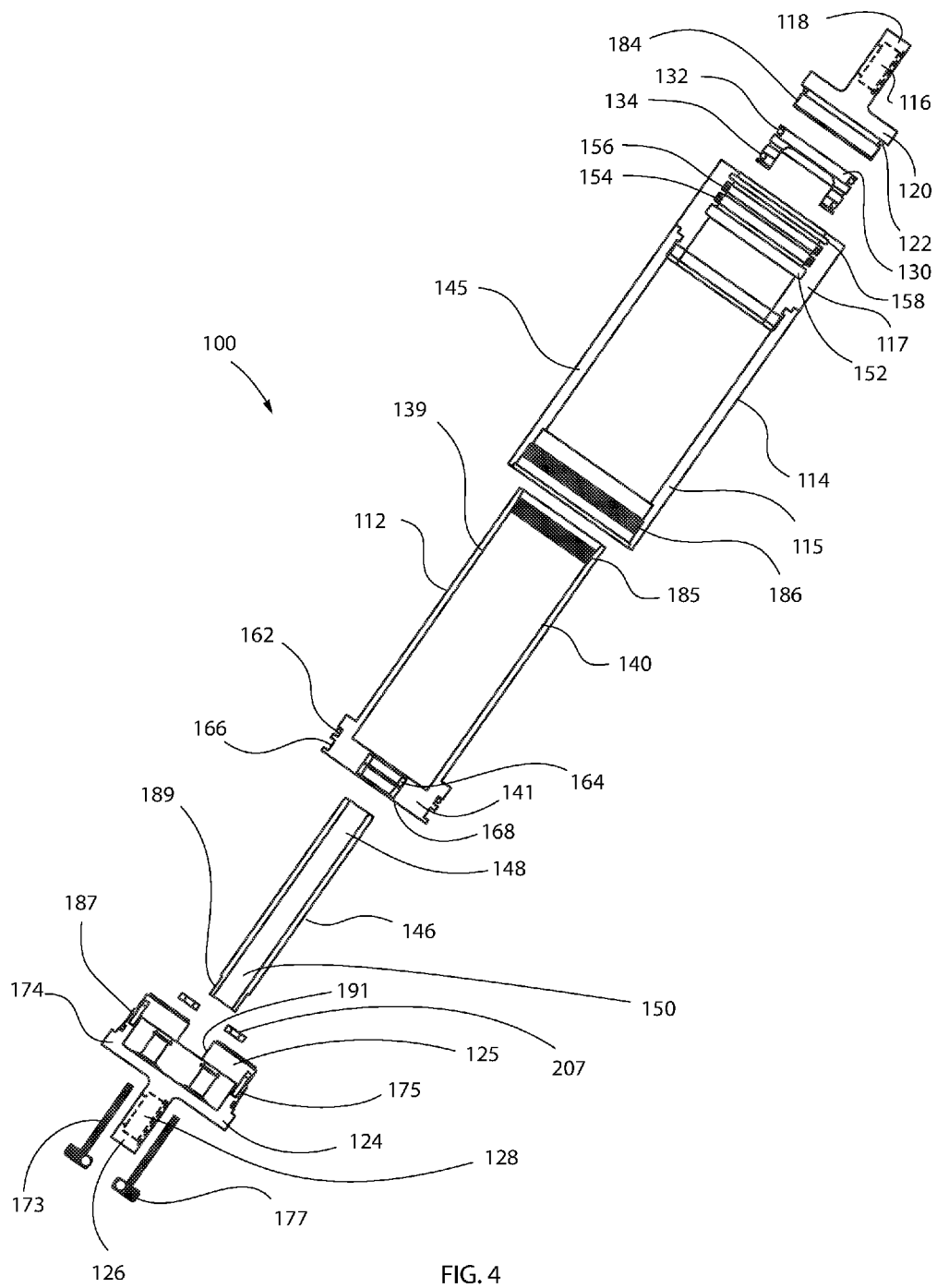
FIG. 4 is an exploded view of the shock absorber of FIGS. 2A and 2B in accordance with an embodiment of the invention.

In describing embodiments of the present invention, specific terminology is employed for the sake of clarity. The invention, however, is not intended to be limited to the specific terminology so selected, and it is to be understood that each specific element includes all technical equivalents that operate in a similar manner to accomplish similar functions. Wherever possible, the same reference numbers are used in the drawings and the description to refer to the same or like parts.

Referring now to FIGS. 1A, 1B, 3, 5A, 5B, 7A and 7B, the preferred embodiment comprises shock absorber 10, wherein shock absorber 10 comprises inner tube 12, top eyelet 20, outer tube 14, bottom eyelet 24, floating piston 30, valve block 74 and stationary tube 46. Top eyelet 20 comprises top mount 18 and top bolt throughhole 16, wherein top bolt throughhole 16 is disposed in top mount 18, and wherein top bolt throughhole 16 is adapted to receive a mounting bolt (not shown) for securing shock absorber 10 to the chassis (not shown) of a vehicle, as is known in the art. Top eyelet 20 further comprises top eyelet threads 84 and gas filling nipple receiver 94.

Inner tube 12 comprises side wall 40, first end 39 and head 41. First end 39 comprises inner tube threads 85, wherein inner tube threads 85 cooperatively engage with top eyelet threads 84, and wherein top seal 22 is disposed between top eyelet 20 and inner tube 12, thereby hermetically sealing top eyelet 20 to inner tube 12. Head 41 comprises seals 62, 64, 66, 68, wherein seals 62, 66 are disposed outward from head 41 in contact with outer tube 14, slidably sealing against outer tube 14, and wherein seals 64, 68 are disposed inward from head 41, and are disposed in contact with stationary tube 46, slidably sealing against stationary tube 46. Floating piston 30 is disposed within inner tube 12, wherein floating piston 30 separates first fluid chamber 90 (gas) from second fluid chamber 36 (oil). Head 41 separates upper side fluid chamber 60 and lower side fluid chamber 72, the former being formed between side wall 40 and outer tube 14 and the latter being enclosed by head 41, stationary tube 46, valve block 74 and outer tube 14. Inner tube 12 comprises piston tube holes 43 providing fluid communication between second fluid chamber 36 and upper side fluid chamber 60.

As shock absorber 10 is compressed, fluid passes from second fluid chamber 36 into upper side fluid chamber 60 via piston tube holes 43. Concurrently, fluid passes from lower side fluid chamber 72 into fourth fluid chamber 88. Fluid may subsequently pass from fourth fluid chamber 88 through valve block 74 into third fluid chamber 44 within stationary tube 46 and on into second fluid chamber 36.

Stationary tube 46 is of diameter selected to provide a desired flow between second and fourth fluid chambers 36 and 88 via third fluid chamber 44, and a desired pressure increase/decrease as stationary tube 46 enters/withdraws from second fluid chamber 36, wherein as stationary tube 46 enters second fluid chamber 36, floating piston 30 rises within inner tube 12, thereby increasing the pressure in first fluid chamber 90, and vice versa.

As shock absorber 10 expands, fluid passes from upper side fluid chamber 60 into second fluid chamber 36 via piston tube holes 43, flows into third fluid chamber 44, subsequently passing through valve block 74 into fourth fluid chamber 88 and finally into lower side fluid chamber 72 via passageways 79.

Bottom eyelet 24 comprises bottom eyelet threads 87, bleed nipple 95 and bottom mount 26, wherein bottom mount 26 has disposed therethrough bottom bolt throughhole 28, and wherein bottom bolt throughhole 28 is adapted to receive a mounting bolt (not shown) for securing shock absorber 10 to the suspension (not shown) of a vehicle, as is known in the art.

Outer tube 14 comprises side wall 45, first end 15 and second end 17, wherein first end 15 comprises seals 52, 54, 56 and 58, and wherein second end 17 comprises outer tube threads 86, and wherein outer tube threads 86 cooperatively engage bottom eyelet threads 87, and wherein bottom seal 82 is disposed between bottom eyelet 24 and outer tube 14, thereby hermetically sealing bottom eyelet 24 to outer tube 14.

Turning now more particularly to FIGS. 1B, 3, 5A, 5B, 7A and 7B, valve block 74 comprises passageways 79 and valve central threads 83, wherein valve central threads 83 cooperatively engage stationary tube threads 89. Plate 80 is disposed on and secured to valve block 74 via fastener 76. Valve block 74 comprises outer threads 27, wherein outer threads 27 secure valve block 74 to bottom eyelet 24 by threaded engagement of outer threads 27 and bottom eyelet threads 87 with outer tube threads 86, and wherein fourth fluid chamber 88 is thereby formed between valve block 74 and bottom eyelet 24.

Valve block 74 (best shown in FIGS. 7A and 7B) comprises fastener 76, top 69, bottom 71, optional passageways 79, optional openings 101, first throughholes 65 and second throughholes 67, wherein first throughholes 65 allow flow through valve block 74 during expansion of shock absorber 10, and wherein second throughholes 67 allow flow through valve block 74 during compression of shock absorber 10.

Optional passageways 79 and openings 101 provide unrestricted flow to shim plate 80 during compression and unrestricted flow back to chamber 72 during extension. Throughholes 65 channel flow to shim plate 63 in extension and throughholes 67 channel flow to plate 80 in compression.

During expansion, fluid flowing through valve block 74 from third fluid chamber 44 to fourth fluid chamber 88 enters first throughholes 65 via first top orifices 75 and exits via first bottom orifices 81. However, flow is restricted by one or more lower shim plates 63, wherein lower shim plates 63 are secured against valve block 74 via fastener 76. As fluid is forced through first throughholes 65, lower shim plates 63 flex to permit fluid to pass. The force acting on shim plates 63 by the pressure produced will make shim plates 63 flex and allow fluid to pass through. The amount of flexing is determined by the number and thickness of each shim plate 63.

During compression, fluid flowing through valve block 74 from fourth fluid chamber 88 to third fluid chamber 44 enters second throughholes 67 via second bottom orifices 77 and exits via second top orifices 73. However, flow is restricted by one or more plates 80, selectively including plates 103, 105, wherein plates 80 are secured against valve block 74 via fastener 76. As fluid is forced through second throughholes 67, plates 80 flex to permit fluid to pass. The force acting on shim plates 63 by the pressure produced will make shim plates 63 flex and allow fluid to pass through. The amount of flexing is determined by the number and thickness of each shim plate 63.

By addition of shim plates 103, 105, additional strengthening of plate 80 is achieved to thereby provide adjustment of flow resistance by an appropriate selection of additional shim plates 103, 105. By varying the stiffness of each plate 80, 103, 105, and/or by changing the diameter and/or thickness, the flow resistance is tailored to cover a wide range of pressure values during shock operation. It will be recognized by those skilled in the art that, similarly, for lower shim plates 63, adjustment of flow resistance is selectively adjusted by additional, stiffer, or larger diameter shim plates 63.

Stationary tube 46 comprises first end 48, second end 50 and stationary tube threads 89 disposed at second end 50, wherein stationary tube threads 89 cooperatively engage valve central threads 83, thereby securing stationary tube 46 to valve block 74, wherein second end 50 is disposed proximate valve block 74.

Floating piston 30 comprises seals 32, 34, wherein seals 32, 34 are disposed in contact with inside of inner tube 12, thereby hermetically slidably sealing floating piston 30 to inner tube 12.

When shock absorber 10 is assembled, first fluid chamber 90 is formed between floating piston 30, inner tube 12 and top eyelet 20, wherein first fluid chamber 90 is subsequently filled with gas, such as, for exemplary purposes only, nitrogen, via a nipple disposed in nipple receiver 94 prior to attachment of shock absorber 10 to a selected vehicle. It will be recognized by those skilled in the art that gas pressure can similarly be adjusted once shock absorber 10 is installed on a vehicle. Second fluid chamber 36 is formed between floating piston 30 and inner tube 12, wherein second fluid chamber 36 is filled during assembly with a suitable shock absorber fluid, such as, for exemplary purposes only, oil.

Second fluid chamber 36 extends into extension chambers 70, and into stationary tube 46 forming third fluid chamber 44 therewithin.

In use, shock absorber 10 is assembled with oil in second, third and fourth fluid chambers, 36, 44, and 88, respectively, and gas is introduced into first fluid chamber 90, and shock absorber 10 is installed on a vehicle. Gas pressure may subsequently be adjusted within first fluid chamber 90 to a pressure adequate to achieve a selected vehicle ride height.

When the vehicle travels over a rough surface causing an impact to the wheels and suspension, such impact compresses shock absorber 10, wherein outer tube 14 is driven toward inner tube 12, thereby shortening shock absorber 10 (best shown in FIG. 5A). As shock absorber 10 shortens in length, fluid from lower side fluid chamber 72 is forced through passageways 79 into fourth fluid chamber 88. Since fourth fluid chamber 88 is of fixed dimension, fluid is subsequently forced through valve block 74 into third fluid chamber 44 and ultimately into contiguous second fluid chamber 36. The increased volume of fluid in second fluid chamber 36 causes floating piston 30 to move toward top eyelet 20, thereby compressing gas in first fluid chamber 90 and dampening the shock of the impact (best shown in FIG. 5A).

When shock absorber 10 relaxes after removal of the impacting forces, or in any such case that the vehicle moves upward or a dip in the road is encountered, inner tube 12 and outer tube 14 move apart (best shown in FIG. 5B).

Figure 5C:
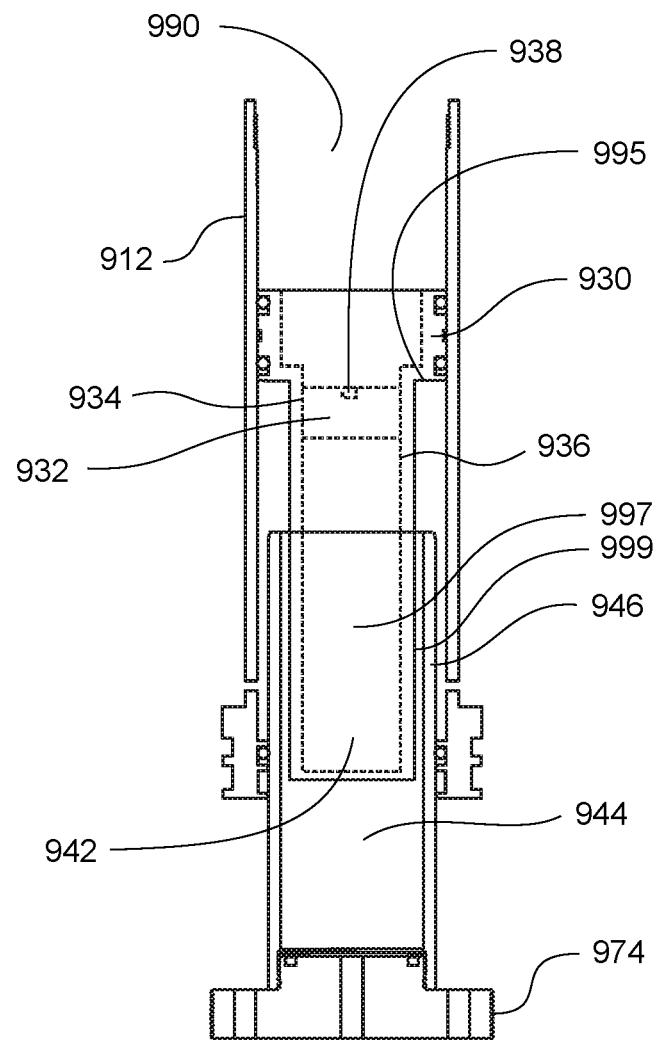
FIG. 5C is a cross-sectional view showing an extended floating piston in accordance with an embodiment of the invention.

In an alternate embodiment of shock absorber 10, as depicted in FIG. 5C, floating piston 930 disposed within inner tube 912 comprises piston head 995 and piston extension 999, wherein piston extension 999 comprises gas space expansion chamber 997, and wherein piston extension 999 extends from piston head 995 into third fluid chamber 944 within stationary tube 946, and wherein stationary tube 946 is secured to valve block 974.

Modifying floating piston 930 by adding expansion chamber 997, two variables (as described in example I) and their effect in the operation of the shock are changed. First is the available gas volume which now includes not only the area above the floating piston but also the area inside expansion chamber 997. Second, since expansion chamber 997 is now physically located inside stationary tube 946, it has replaced the volume of oil previously inside stationary tube 946 in third fluid chamber 944 above valve block 974. Therefore, as piston tube 912 moves downwards, less oil volume is displaced, and since gas chamber 990 is now larger by addition of expansion chamber 997, less pressure is produced. For those skilled in the art, it will be apparent that by altering the diameter (rod effect) and the length (gas volume area) of expansion tube 936, a softer spring rate and initial ride height can be achieved, compared to shock absorber 10 of the preferred embodiment In a variation of this alternate embodiment, also depicted in FIG. 5C, plug 932 subdivides expansion chamber 997 from first fluid chamber 990 by forming lower expansion section 942, wherein plug 932 having external threads 934 is threadedly engaged with threads 936 on the inside of expansion chamber 997, wherein plug 932 is rotated, via, for exemplary purposes only, an Allen wrench inset, to increase/decrease lower expansion section 942 while correspondingly decreasing/increasing the volume of first fluid chamber 990.

In this variation, plug 932 may selectively be installed within piston extension 999, wherein plug 932 comprises drive socket 938 and threads 934, and wherein piston extension 999 comprises internal threads 936. Threads 934 and internal threads 936 cooperatively engage to threadedly seal plug 932 to piston extension 999, thereby isolating extension fluid chamber 942 from first fluid chamber 990. Extension fluid chamber 942 can selectively be reduced/enlarged in volume by screwing in/screwing out plug 932. Optionally, oil or gas could be selected to fill extension fluid chamber 942.

Referring now to FIGS. 2A, 2B, 4, 6A, 6B and 8, illustrated therein is a first alternate embodiment of shock absorber 10, wherein the alternate embodiment of FIGS. 2A, 2B, 4, 6A, 6B and 8 is substantially equivalent in form and function to that of the preferred embodiment detailed and illustrated in FIGS. 1A, 1B, 3, 5A, 5B and 7 except as hereinafter specifically referenced. Specifically, the embodiment of FIGS. 2A, 2B, 4, 6A, 6B and 8 comprises shock absorber 100, wherein shock absorber 100 comprises inner tube 112, top eyelet 120, outer tube 114, bottom eyelet 124, floating piston 130, valve block 174 and stationary tube 146. Top eyelet 120 comprises top mount 118 and top bolt throughhole 116, wherein top bolt throughhole 116 is disposed in top mount 118, and wherein top bolt throughhole 116 is adapted to receive a mounting bolt (not shown) for securing shock absorber 100 to the chassis (not shown) of a vehicle, as is known in the art. Top eyelet 120 further comprises top eyelet threads 184 and gas filling nipple port 194.

Inner tube 112 comprises side wall 140, first end 139 and head 141. First end 139 comprises inner tube threads 185, wherein inner tube threads 185 cooperatively engage with top eyelet threads 184, and wherein top seal 122 is disposed between top eyelet 120 and inner tube 112, thereby hermetically sealing top eyelet 120 to inner tube 112. Head 141 comprises seals 162, 164, 166, 168, wherein seals 162, 166 are disposed outward from head 141 in contact with outer tube 114, slidably sealing against outer tube 114, and wherein seals 164, 168 are disposed inward from head 141, and are disposed in contact with stationary tube 146, slidably sealing against stationary tube 146. Stationary tube 146 is of diameter selected to provide a desired flow between second and fourth fluid chambers 136 and 188 via third fluid chamber 144, and a desired pressure increase/decrease as stationary tube 146 enters/withdraws from second fluid chamber 136, wherein as stationary tube 146 enters second fluid chamber 136, floating piston 130 rises within inner tube 112, thereby increasing the pressure in first fluid chamber 190, and vice versa.

Head 141 separates upper side fluid chamber 160 and lower side fluid chamber 172, the former being formed between side wall 140 and outer tube 114 and the latter being enclosed by head 141, stationary tube 146, valve block 174 and outer tube 114.

As shock absorber 100 is compressed, fluid passes from second fluid chamber 136 into upper side fluid chamber 160 via piston tube holes 143. Concurrently, fluid passes from lower side fluid chamber 172 through valve block 174 into fourth fluid chamber 188. Fluid further passes from fourth fluid chamber 188 into third fluid chamber 144 within stationary tube 146 and on into second fluid chamber 136.

As shock absorber 100 expands, fluid passes from upper side fluid chamber 160 into second fluid chamber 136 via piston tube holes 143, flows into third fluid chamber 144, into fourth fluid chamber 188 and finally into lower side fluid chamber 172 via valve block 174.

Bottom eyelet 124 comprises, nipple port 195, bottom eyelet threads 187 and bottom mount 126, wherein bottom mount 126 has disposed therethrough, bottom bolt throughhole 128, and wherein bottom bolt throughhole 128 is adapted to receive a mounting bolt (not shown) for securing shock absorber 110 to the suspension (not shown) of a vehicle, as is known in the art. Nipple port 195 is adapted to receive a nipple, wherein nipple port 195 is in fluid communication with fourth fluid chamber 188 and provides for filling of shock absorber 100.

Outer tube 114 comprises side wall 145, second end 117 and outer tube cap 115, wherein outer tube cap 115 comprises seals 152, 154, 156 and 158, and wherein second end 117 comprises outer tube threads 186, and wherein outer tube threads 186 cooperatively engage bottom eyelet threads 187, and wherein bottom seal 182 is disposed between bottom eyelet 124 and outer tube 114, thereby hermetically sealing bottom eyelet 124 to outer tube 114.

Continuing to refer to FIGS. 2B, 4, 6A, 6B and 8, valve block 174 comprises dowel pins 175 and adjusters 177. Valve block 174 is secured to bottom eyelet 124 by dowel pins 175 and engagement with outer tube 114, wherein of bottom eyelet threads 187 cooperatively engage outer tube threads 186, and wherein fourth fluid chamber 188 is formed between valve block 174 and bottom eyelet 124.

Rotation of each of adjusters 177, 178 rotates their respective oblately-spheroid oblong plates 203, 204 to change the force holding cover plates 205, 206 to permit regulated adjustment of flow through valve block 174.

Figure 8:
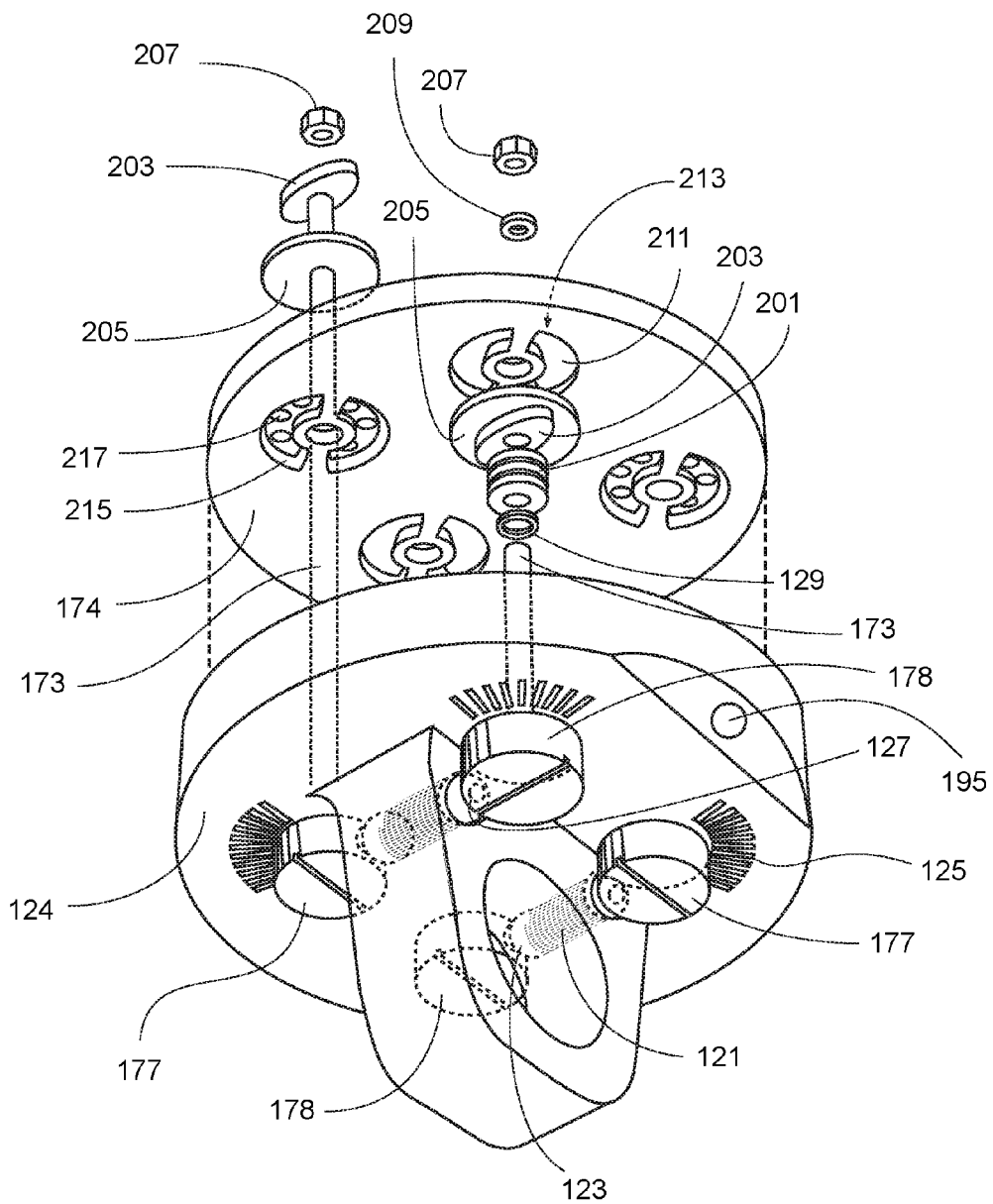
FIG. 8 is a bottom perspective view of an externally-adjusted valve block of FIGS. 2A and 2B in accordance with an embodiment of the invention.

Referring now more particularly to FIG. 8, valve block 174 comprises at least one compression exit 211 with at least one compression entrance 213 in fluid communication therewith. Valve block 174 further comprises at least one expansion opening 215 and at least one set of expansion holes 217 in communication therewith.

Valve block 174 is further secured to bottom eyelet 124 via adjusters 177, 178, wherein adjusters 177, 178 comprise shafts 173, and wherein shafts 173 carry thereon a plurality of retaining rings 129, spring disc assemblies 201, oblong plates 203, 204, cover plates 205, 206, spacers 209 and nuts 207. Rotation of adjusters 177, 178, respectively, change the flow through valve block 174 during compression and expansion.

Cover plate 205 is disposed over compression exit 211 or expansion holes 217, wherein oblong plate 203 is disposed outboard of cover plate 205 from compression exit 211 or expansion holes 217, and wherein oblong plate 203 is disposed against cover plate 205 when adjusters 177, 178, bottom eyelet 124 and valve block 174 are assembled. Spring disc assembly 201 and retaining ring 129 are disposed further outboard, wherein retaining ring 129 is disposed proximate bottom eyelet 124, and wherein spring disc assembly 201 applies pressure to oblong plate 203 holding same against cover plate 205.

Adjusters 177, 178 comprise detents 127 thereon and bottom eyelet 124 comprises indicia 125, springs 121 and ball bearings 123, wherein springs 121 apply pressure to ball bearings 123 forcing same into detents 127 in adjusters 177, 178, and wherein rotation of adjusters 177, 178 is restrained by pressure of ball bearings 123. Indicia 125 serve to provide a reference during rotation of adjusters 177, 178.

During compression of alternate embodiment shock absorber 100, fluid from third fluid chamber 144 is forced through valve block 174 into fourth fluid chamber 188, wherein fluid enters compression entrance 213 and passes through compression exit 211 forcing cover plate 205 to flex to permit fluid flow. Positioning of oblong plate 203 allows selective flow through compression exit 211, wherein oblong plate 203 may be selectively disposed such that oblong plate 203 allows full flex or partial flexing of cover plate 205. When full flex is desired, oblong plate 203 is disposed between compression exits 211, wherein when partial flexing of cover plate 205 is desired, oblong plate 203 is positioned over compression exits 211. It will be recognized by those skilled in the art that the size of compression exits 211 will also be determinative of flow.

During expansion of alternate embodiment shock absorber 100, fluid from fourth fluid chamber 188 is forced into expansion opening 215 and passes through expansion holes 217 forcing cover plate 206 to flex to permit fluid flow. Positioning of oblong plate 204 allows selective flow through expansion holes 217, wherein oblong plate 204 may be selectively disposed such that oblong plate 204 allows full flex or partial flexing of cover plate 206. When full flex is desired, oblong plate 204 is disposed between expansion holes 217 (and also between expansion openings 215), wherein when partial flexing of cover plate 205 is desired, oblong plate 204 is positioned over expansion holes 217. It will be recognized by those skilled in the art that the size of expansion holes 217 will also be determinative of flow.

Stationary tube 146 comprises first end 148, second end 150 and stationary tube threads 189 disposed at second end 150, wherein stationary tube threads 189 cooperatively engage valve block internal threads 191, thereby securing stationary tube 146 to valve block 174, wherein second end 150 is disposed proximate valve block 174.

Floating piston 130 comprises seals 132, 134, wherein seals 132, 134 are disposed in contact with inside of inner tube 112, thereby hermetically slidably sealing floating piston 130 to inner tube 112.

When shock absorber 100 is assembled, first fluid chamber 190 is formed between floating piston 130, inner tube 112 and top eyelet 120, wherein first fluid chamber 190 is subsequently filled with gas, such as, for exemplary purposes only, nitrogen, via a gas nipple disposed in nipple port 194 after shock absorber 100 is attached to a selected vehicle. Second fluid chamber 136 is formed between floating piston 130 and inner tube 112, wherein second fluid chamber 136 is filled during assembly with a suitable shock absorber fluid, such as, for exemplary purposes only, oil. Second fluid chamber 136 extends into extension chambers 170, and into stationary tube 146 forming third fluid chamber 144 therewithin.

Following is an example of a shock absorber design, drawing from the above preferred and selected alternate embodiments, and is not intended to limit the preferred and alternate embodiments:

EXAMPLE I

Process

Shock absorber 10 is first fully extended (inner tube 12 pulled all the way out) and floating piston 30 is set at its lowest position (just above piston tube holes 43). Shock absorber 10 is then filled with oil in all chambers below floating piston 30. First fluid chamber 90 is subsequently filled with nitrogen at an initial pressure ($P_i$). Shock absorber 10 is now pressurized. When an external force is applied (such as the weight of a vehicle) it will produce pressure ($P_v$) in second fluid chamber 36 below piston ring 41 which will act against first fluid chamber 90 pressure. This pressure differential ($dP=P_v-P_i$) will cause the inner tube 12 to move downwards. By doing so, oil is displaced against floating piston 30 causing it to move upwards, which in turn causes the pressure in the first fluid chamber 90 to increase. Inner tube 12 eventually stops when the pressure in first fluid chamber 90 equals the pressure in the second fluid chamber 36. The vehicle settles at a given ride height. Raising or lowering the $P_i$, changes the dP and accordingly the ride height.

"Spring Rate" Equivalent/Upper Reservoir

For example, a regular car spring requires 300 lbs to move one inch. Its spring rate is then 300 lbs/inch. First fluid chamber 90 is of fixed dimensions. When floating piston 30 moves up it reduces the volume of first fluid chamber 90 which in turn increases the pressure and vice versa. The amount by which the pressure will increase depends solely by the distance floating piston 30 moves into first fluid chamber 90. The distance by which floating piston 30 moves depends on the volume of oil displaced and by the volume of stationary tube 46 entering second fluid chamber 36. For example, shock absorber 10 is shortened by one inch. Floating piston 30 moves up and the pressure in first fluid chamber 90 increases by 1000 psi, which for a given chamber dimension equates to approximately 400 lbs of force. The "equivalent spring rate" is 400 lbs/in. By adding additional gas-containing chamber 333 (best shown in FIG. 9A) on top of the unit the nitrogen volume is increased. It will be recognized that additional gas containing chamber 333 could be utilized with the preferred and first alternate embodiments. This means that for the same amount of piston movement, the pressure increase will be less, resulting in 200 lbs of force, thus, reducing the "spring rate" to 200 lbs/in. External reservoir 311 has movable piston 332 thereinside which controls the chamber's volume. By positioning the piston at different heights in the reservoir, the volume is altered, and, in turn, the "spring rate" changes. Since the nitrogen pressure does not reduce in a linear fashion, the spring rate is effectively progressive.

Oil Displaced

The amount of oil being displaced depends on how far the piston tube moves.

1. As inner tube 12 moves down a given distance, the oil volume under floating head 41 is displaced, passing through controlled portion of valve block 74 into third fluid chamber 44, wherein the rate of movement is controlled by valve block 74 and stationary tube 46. As this is happening, upper side fluid chamber 60 expands above piston head 41 drawing excess into upper side fluid chamber 60, between inner tube 12 and outer tube 14. Part of the fluid volume displaced equal to the area between the OD of inner tube 12 and the ID of outer tube 14 will fill upper side fluid chamber 60 through inner tube 12 piston tube holes 43. The remaining oil volume displaced, defined as the area between inner tube 12 OD and stationary tube 46 OD ($V_o$), will act against floating piston 30 producing pressure P1.

2. As inner tube 12 moves down, stationary tube 46 enters second fluid chamber 36 the same distance (acting like a rod) causing a reduction in volume ($V_t$). This volume reduction produces an additional pressure, P2. The larger the diameter of stationary tube 46, the greater the P2 compared to P1.

Flow Constriction

The four piston tube holes 43 on inner tube 12 serve to constrict the flow especially during rebound and provide additional damping. As inner tube 12 extends upwards, piston tube holes 43 pass beyond outer tube cap 39 and gradually close the communication channel between upper side fluid chamber 60 and inner tube 12. It will be recognized by those skilled in the art that piston tube holes 43 may be selectively of different size, number and/or shape to provide a desired effect.

Hydraulic Lock

First fluid chamber 90 containing, for exemplary purposes only, nitrogen, must have sufficient volume to accommodate all the fluid being displaced ($V_o$ and $V_t$) for the entire stroke movement of shock absorber 10 to prevent hydraulic lock and damage to the shock. First fluid chamber 90 is selectively increased in size and/or by the addition of external nitrogen reservoir (best shown in FIG. 9A). The stroke movement depends on the application and varies.

Note: For the purposes of this example, the non-pressure-contributing oil volume in upper side fluid chambers 60, 160 is equal in both the preferred and first alternate embodiments since floating pistons 30, 130 comprise the same diameter.

Therefore, first fluid chambers 90, 190 are reduced in volume ($V_t$) by an amount equal to stationary tubes 46, 146, volume and the volume of the oil being displaced ($V_o$). The total pressure increase will be P3=P1+P2. The total volume reduction in first fluid chambers 90, 190 is the same for the preferred and first alternate embodiment, and so is P3. The preferred embodiment shock absorber 10 has a larger diameter stationary tube 46 and smaller $V_o$ than the stationary tube 146 of the first alternate embodiment shock absorber 100, which results in different pressure ratios for shock absorber 10 and shock absorber 100. Both units utilize valves blocks 74, 174 to control the oil displaced ($V_o$), wherein for the alternate embodiment, valve block 174 provides adjustment from the outside of shock absorber 100.

The preferred and first alternate embodiments both utilize nitrogen under pressure in first fluid chamber 90, 190, respectively, above the floating piston, to hold the vehicle up, thus replacing a conventional spring. During operation valve blocks 74, 174, respectively, regulate the flow of oil passing therethrough, providing the desired damping characteristics.

Figure 9A:
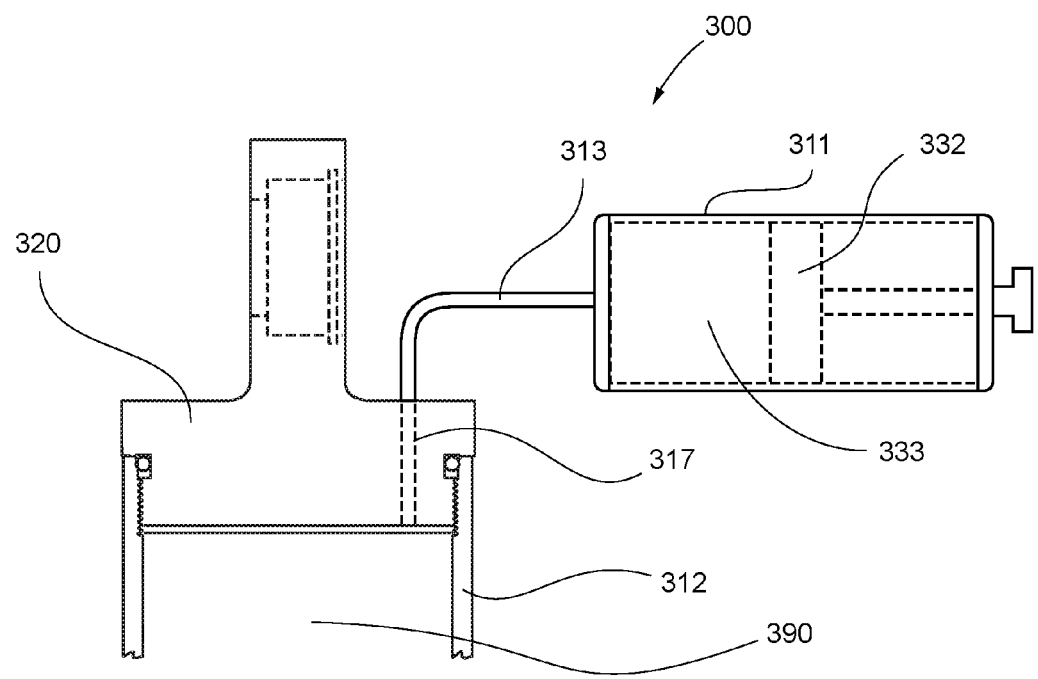
FIG. 9A is a side cross-sectional view of an external fluid reservoir in fluid communication with the upper gas chamber in accordance with an embodiment of the invention.

Referring now to FIG. 9A, illustrated therein is an alternate embodiment of shock absorber 10 or 100, wherein the alternate embodiment of FIG. 9A comprises shock absorber 300 having additional external reservoir 311 in fluid communication with first fluid chamber 390 within inner tube 312 via pipe 313, wherein pipe 313 passes through top eyelet 320 via channel 317 opening into first fluid chamber 390. External reservoir 311 comprises movable piston 332 and variable gas-containing chamber 333 therewithin.

Movement of movable piston 332 to reduce volume of gas, such as, for exemplary purposes only, nitrogen, in gas-containing chamber 333 increases gas pressure within first fluid chamber 390, thereby providing support for a vehicle of greater weight. Conversely, for lighter vehicles, movable piston 332 is operated to increase the volume of gas in gas-containing chamber 333, thereby reducing the pressure within first fluid chamber 390. That is, varying nitrogen volume has a direct effect on pressure and affects both original ride height and "effective spring rate".

Figure 9B:
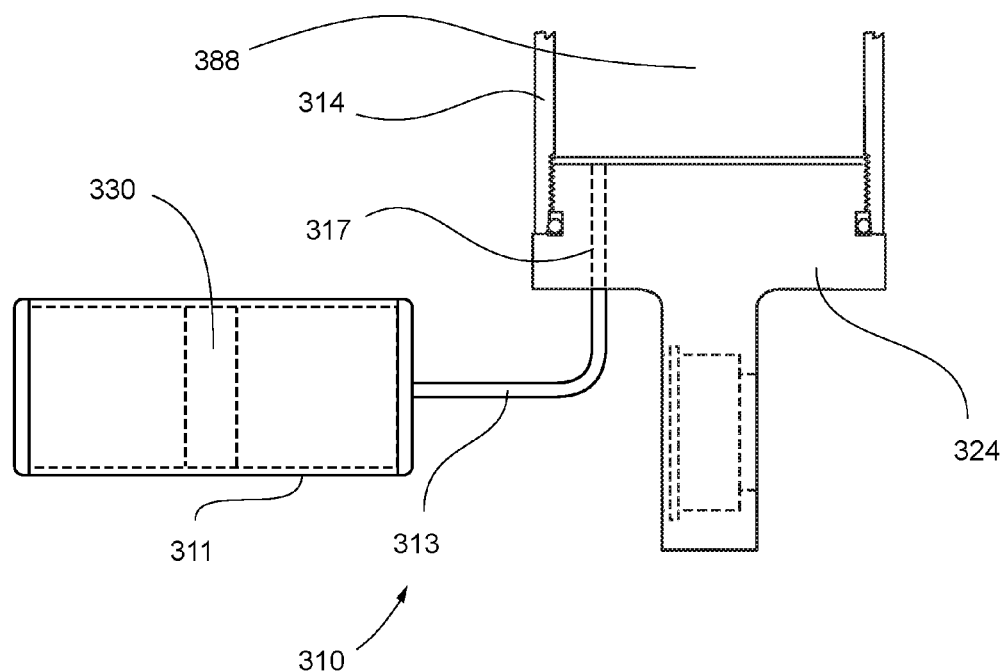
FIG. 9B is a side cross-sectional view of an external fluid reservoir in fluid communication with the lower oil chamber in accordance with an embodiment of the invention.

Referring now to FIG. 9B, illustrated therein is an alternate embodiment of shock absorber 10 or 110, wherein the alternate embodiment of FIG. 9B comprises shock absorber 310 with additional external reservoir 311 having floating piston 330 therewithin, wherein external reservoir 311 is in fluid communication via pipe 313 with fourth fluid chamber 388 within outer tube 314, wherein pipe 313 passes through bottom eyelet 324 opening into fourth fluid chamber 388, thereby reducing the amount of oil being displaced which is accommodated by expansion of first fluid chamber 90 ($V_o$) (not shown). An oil volume ($V_w$) equal to the inner (piston) tube 12, 112 (best shown in FIGS. 1A and 2A) wall thickness as it enters the lower chamber is be displaced into external reservoir 311. Thus, for the same given inner (piston) tube 12, 112 movement, an oil volume equal to ($V_o-V_w$) is displaced, acting against the volume in the first fluid chamber, thereby reducing P1.

Figure 10:
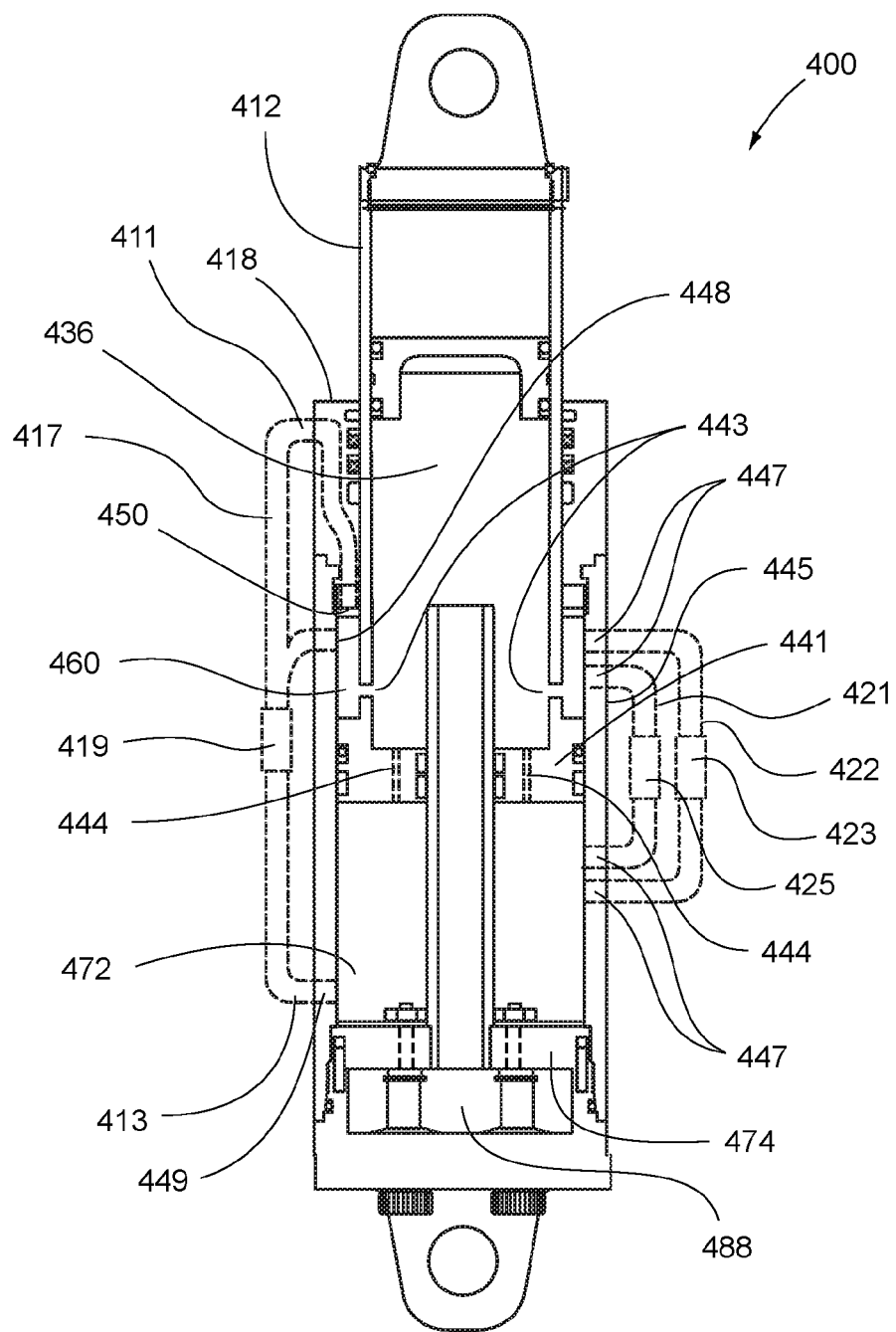
FIG. 10 is a side cross-sectional view of two alternative external equilibration systems in accordance with an embodiment of the invention.

Referring now to FIG. 10, illustrated therein is an alternate embodiment of shock absorber 100, wherein the alternate embodiment of FIG. 10 is shock absorber 400 having bleed valves 444 to accommodate very small inner (piston) tube 412 movement, thereby bypassing valve block 474. It will be recognized by those skilled in the art that bleed valves, such as bleed valves 444, could be utilized with the preferred and first alternate embodiments hereinabove. Further, small holes 443 allow direct flow exchange between second fluid chamber 436 and upper side fluid chamber 460, as with the preferred and first alternate embodiments. One or more external bypass tubes 417, 421, 422 can also be located between side fluid chambers 472 and 460 to accommodate slow speed movement. Bypass tube 417 comprises first end 411 and second end 413, wherein first end 411 passes through outer tube side wall 445 exiting into upper side fluid chamber 460 via aperture 448, and wherein second end 413 opens into lower side fluid chamber 472 via aperture 449. Alternatively, first end 411 could pass through first end 418 of outer tube 414 exiting into upper fluid chamber 460 via opening 450. Bypass tubes 421 and 422 similarly communicate with upper side fluid chamber 460 and lower side fluid chamber 472 via holes 447. Bypass tubes 417, 421 and 422 may selectively have respective control valves 419 (bidirectional), 425 (one way), 423 (one way) to regulate flow in either direction.

Figure 11:
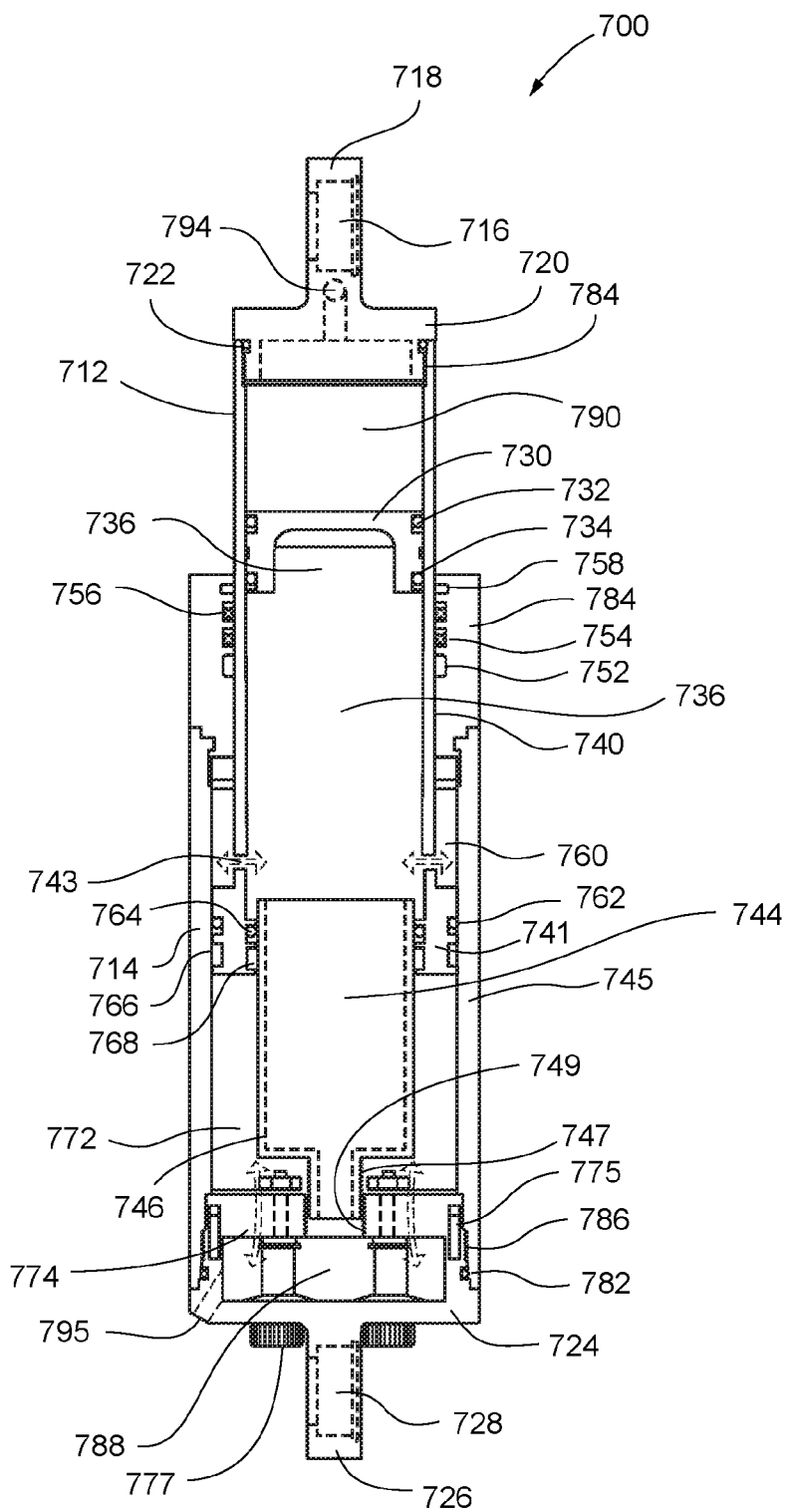
FIG. 11 is a side cross-sectional view of an alternative combination of elements shown in FIGS. 1A/1B and FIGS. 2A/2B in accordance with an embodiment of the invention.

In yet another alternate embodiment depicted in FIG. 11, wherein the alternate embodiment of FIG. 11 is similar in form and function to both the preferred and alternate embodiments depicted in FIGS. 1A-2B, except as noted hereinbelow, shock absorber 700 comprises top eyelet 720 having top mount 718 with top mount throughhole 716 therewithin, inner tube 712, outer tube 714, and bottom eyelet 724 having bottom mount 726 with bottom mount throughhole 728 therewithin. Top eyelet 720 is secured to inner tube 712 via cooperatively-engaging threads 784, wherein top eyelet 720 is sealed to inner tube 712 via seal 722. Top eyelet further comprises gas nipple 794, wherein gas nipple 794 is utilized for filling shock absorber 700 with gas before or subsequent to installation on a vehicle.

Shock absorber 700 further comprises first fluid chamber 790, second fluid chamber 736, third fluid chamber 744, fourth fluid chamber 788, upper side fluid chamber 760 and lower side fluid chamber 772.

Disposed within inner tube 712 is floating piston 730, wherein floating piston 730 is slidably sealed to inner tube 712 via seals 732, 734. and wherein floating piston 730 separates first fluid chamber 790, which typically comprises, for exemplary purposes only, a gas therewithin, from second fluid chamber 736 which typically comprises, for exemplary purposes only, oil therewithin.

Bottom eyelet 724 is secured to outer tube 714 via cooperatively-engaging threads 786 and is sealed to outer tube 714 via seal 782. Bottom eyelet 724 further comprises nipple receiver 795, wherein nipple receiver 795 is in fluid communication with fourth fluid chamber 788. Valve block 774 is disposed within outer tube 714 and is secured within shock absorber 700 via dowel pins 775 and via installation and securing of bottom eyelet 724 to outer tube 714. Valve block 774 comprises internal threads 749, adjusters 777.

Shock absorber 700 further comprises stationary tube 746, wherein stationary tube 746 comprises threads 747, and wherein threads 747 cooperatively engage internal threads 749 of valve block 774 to selective interchange different size combinations of stationary tube 746 and inner tube 712.

Inner tube 712 is slidably engaged to outer tube 714 and to stationary tube 746, wherein seals 752, 754, 756, 758 seal inner tube 712 to top cap 784 of outer tube 714. Inner tube 712 further comprises side wall 740 and head 741, wherein head 741 is slidably sealed to side wall 745 of outer tube 714 via seals 762, 766 and to stationary tube 746 via seals 764, 768. Inner tube 712 further comprises openings 743, wherein openings 743 facilitate fluid communication between second fluid chamber 736 and upper side fluid chamber 760 through sidewall 740 of inner tube 712.

Figure 7A:
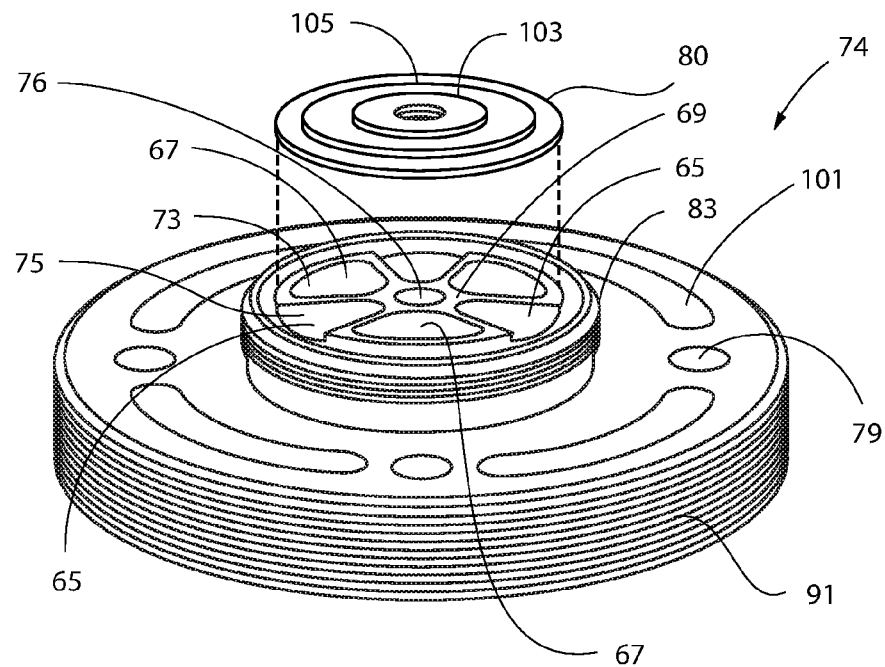
FIG. 7A is a top perspective view of an internally-adjusted valve block of FIGS. 1A and 1B in accordance with an embodiment of the invention.
Figure 7B:
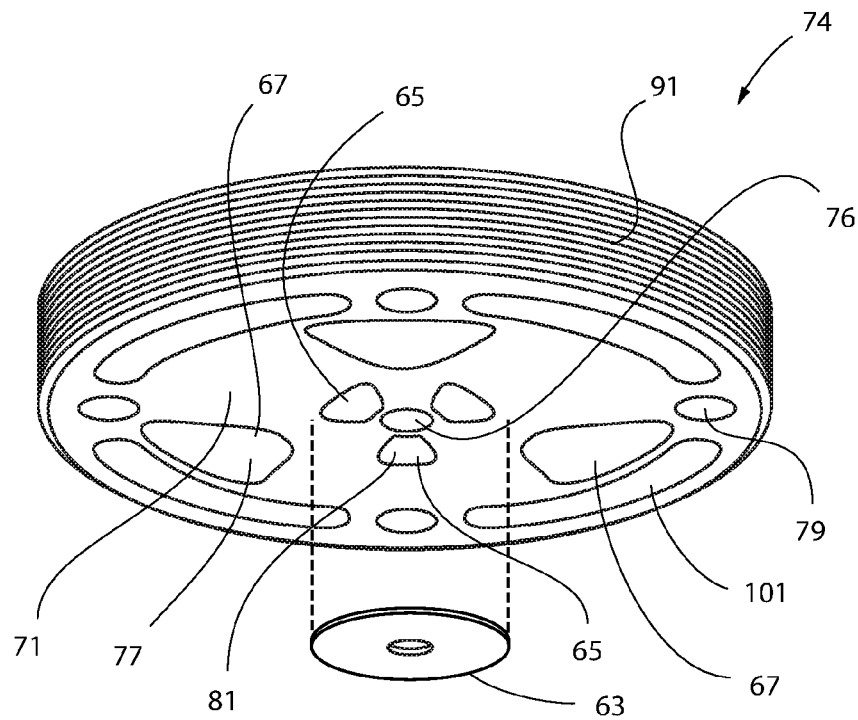
FIG. 7B is a bottom perspective view of an internally-adjusted valve block of FIGS. 1A and 1B in accordance with an embodiment of the invention.
Figure 12A:
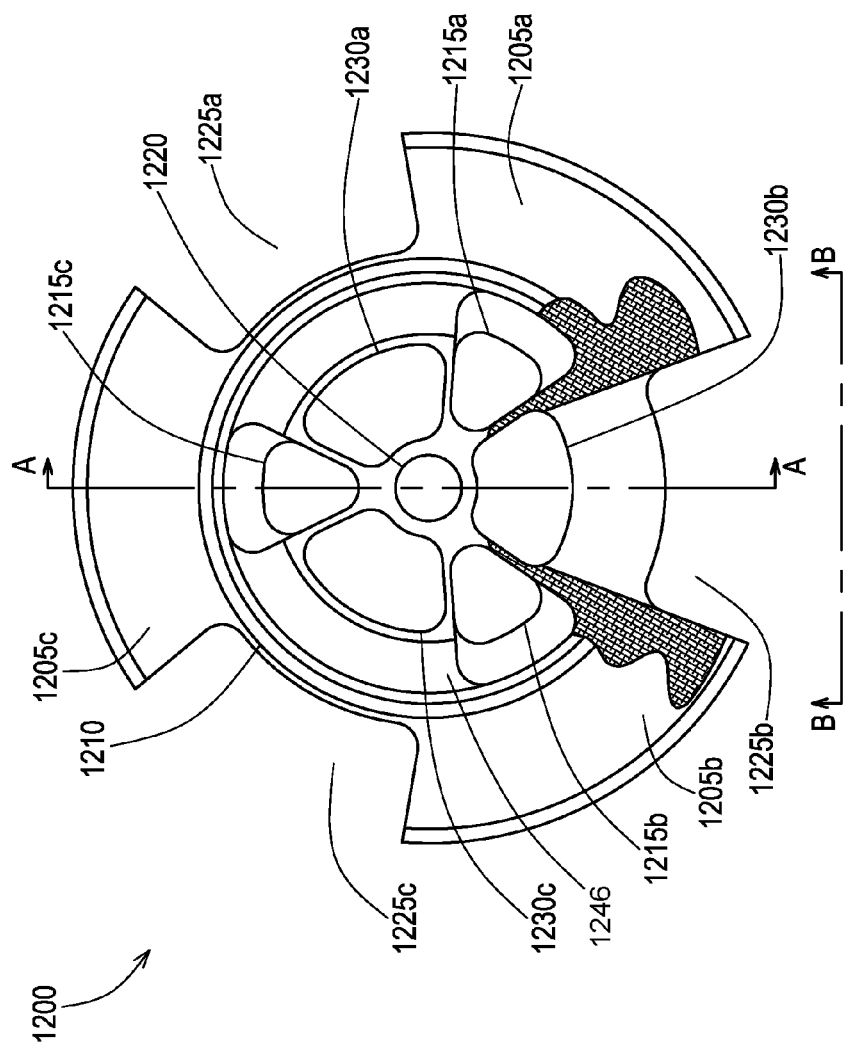
FIG. 12A is a top view of an alternative valve block in accordance with an embodiment of the invention.

While FIGS. 7A and 7B illustrated features of an exemplary embodiment of an internally-adjusted valve block, FIGS. 12A-12E, 13, and 14 illustrate features of an alternative exemplary embodiment of such a valve block. In more detail, FIG. 12A is a top view of an alternative valve block in accordance with an embodiment of the invention. Referring now to FIG. 12A, exemplary valve block 1200 is shown as a modified version of valve block 74. In more detail, valve block 1200 comprises a central portion 1210 that is raised above a plurality of peripheral flanged portions 1205a-1205c. The flanged periphery of valve block 1200 further comprises a plurality of cutout vent passageways 1225a-1225c interspersed between respective ones of the peripheral flanged portions 1205a-1205c.

Figure 12B:
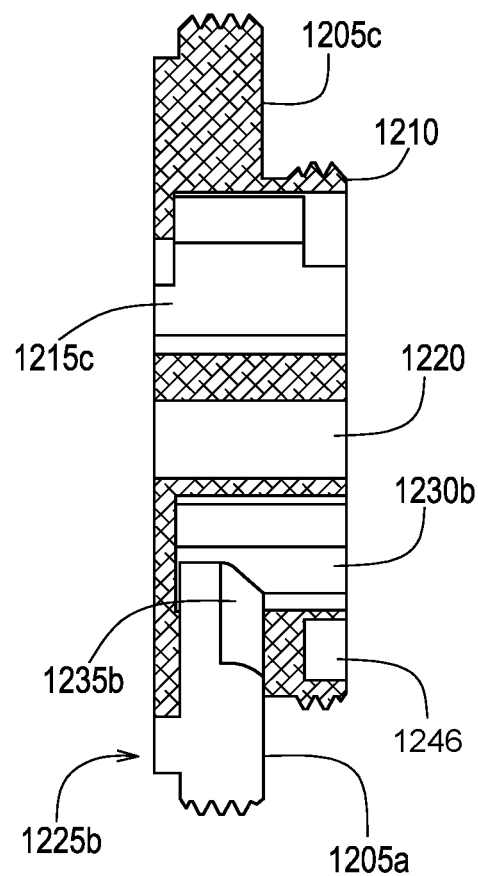
FIG. 12B is a side cross-sectional view of the alternative valve block of FIG. 12A in accordance with an embodiment of the invention.
Figure 12C:
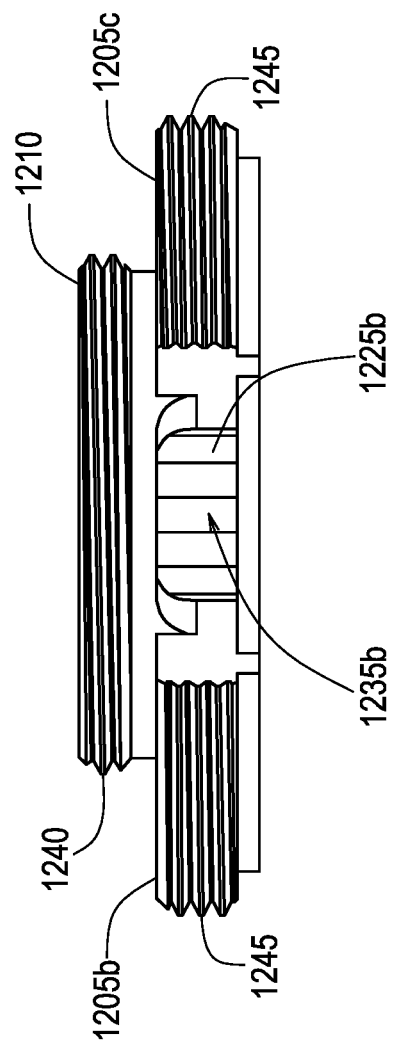
FIG. 12C is a front view of the alternative valve block of FIG. 12A in accordance with an embodiment of the invention.
Figure 12D:
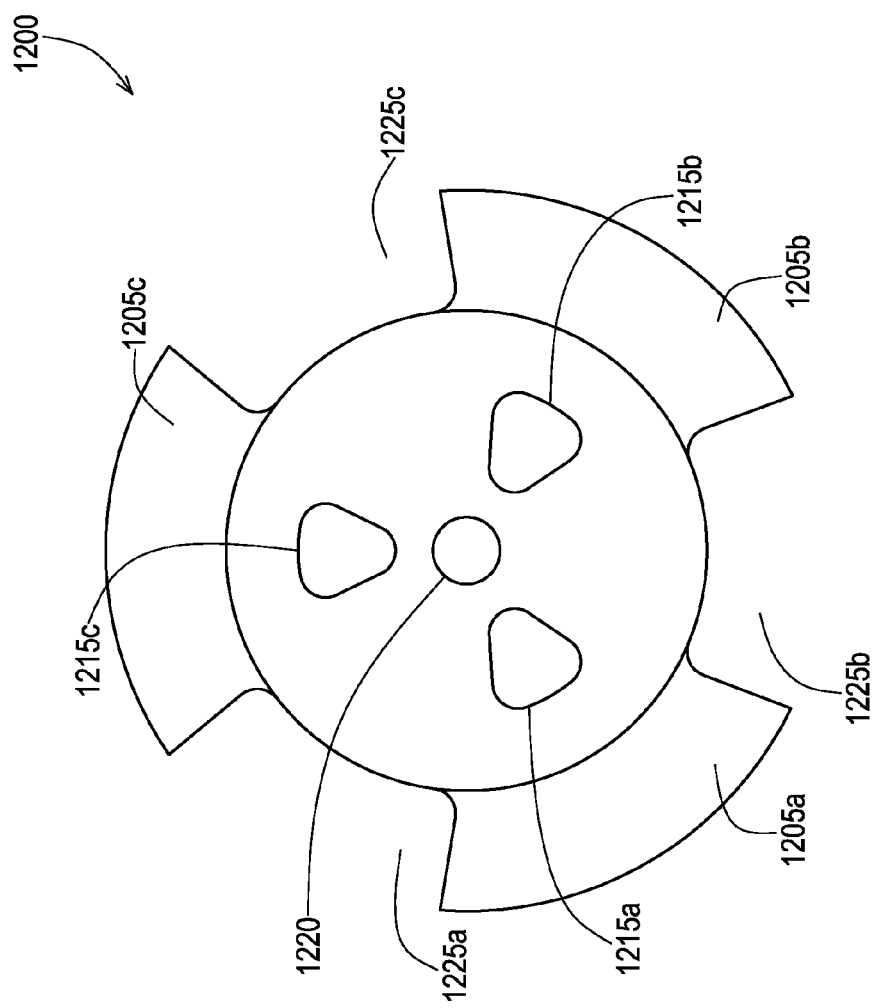
FIG. 12D is a bottom view of the alternative valve block of FIG. 12A in accordance with an embodiment of the invention.

The embodiment of valve block 1200 includes throughholes 1215a-1215c that allow flow through valve block 1200 during expansion (similar to throughholes 65 of valve block 74 shown in the embodiments of FIGS. 7A and 7B). FIG. 12D shows a bottom view of exemplary valve block 1200 and, in particular, where throughholes 1215a-1215c appear along with a fastener aperture 1220 that goes through valve block 1200 on its center axis. Furthermore, exemplary valve block 1200 may also include an annular recessed channel 1246 (shown in the views illustrated in FIGS. 12A, 12B, 12D, 12E, and 13) that helps provide a channel of flow going into and out of throughholes 1215a-1215c.

Valve block 1200 also includes throughholes 1230a-1230c that allow flow through valve block 1200 during compression (somewhat similar to throughholes 67 shown in the embodiment of FIG. 7A). However, throughholes 1230a-1230c connect to respective cutout vent passageways 1225a-1225c as shown in sectional FIG. 12B and side view FIG. 12C. While throughholes 67 are shown in FIG. 7B as a separate aperture from passageway 101, throughholes 1230a-1230c essentially connect to cutout vent passageways 1225a-1225c as a different type of passageway through valve block 1200. FIG. 12B provides a more detailed illustration of how at least throughhole 1230b connects to cutout vent passageway 1225b via internal passageway 1235, which provides an angular passage to the cutout vent passageway 1225b.

Thus, whereas optional passageways 79 and 101 are shown as features of valve block 74 (see FIGS. 7A and 7B that provide unrestricted flow during compression and extension/expansion separate from throughholes 67, such passageways are replaced with cutout vent passageways 1225a-1225c in the alternative embodiment valve block 1200 that are respectively integrated with one end of each of throughholes 1230a-1230c.

Figure 12E:
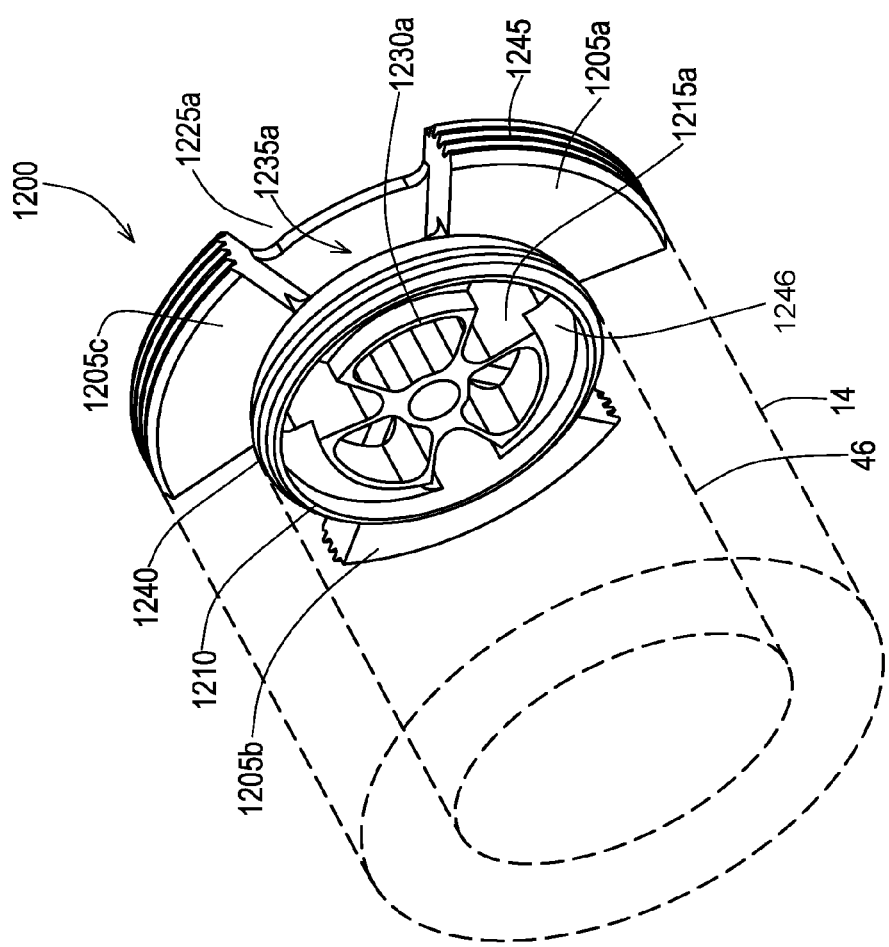
FIG. 12E is a perspective view of the alternative valve block of FIG. 12A shown relative to an exemplary outer tube and exemplary stationary tube fixed to the alternative valve block in accordance with an embodiment of the invention.

FIG. 12E is a perspective view of the alternative valve block of FIG. 12A shown relative to an exemplary outer tube and exemplary stationary tube fixed to the alternative valve block in accordance with an embodiment of the invention. Referring now to FIG. 12E, valve block 1200 appears with stationary tube 46 and outer tube 14 shown in dotted lines to show how valve block 1200 also is fixed to each of such tubes when assembled. The attachment of such tubes is via, for example, threads 1240 and 1245 on valve block 1200. Threads 1240 on the central portion 1210 of valve block 1200 engage with threads on stationary tube 46. Likewise, threads 1245 on the peripheral edge of the peripheral flanged portions 1205a-1205c of valve block 1200 engage with threads on outer tube 14.

Figure 13:
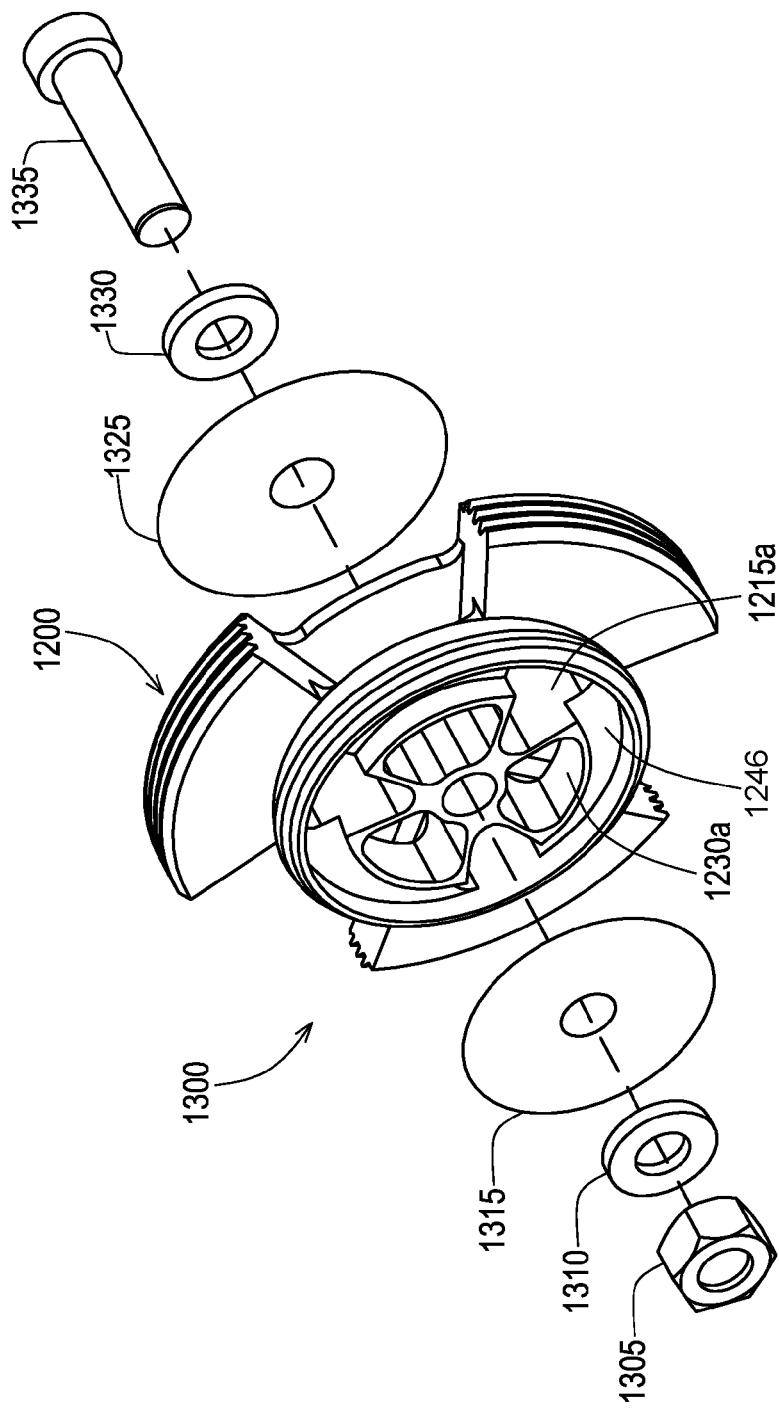
FIG. 13 is an exploded view of an exemplary valve block assembly using the alternative valve block of FIG. 12A in accordance with an embodiment of the invention.
Figure 14:
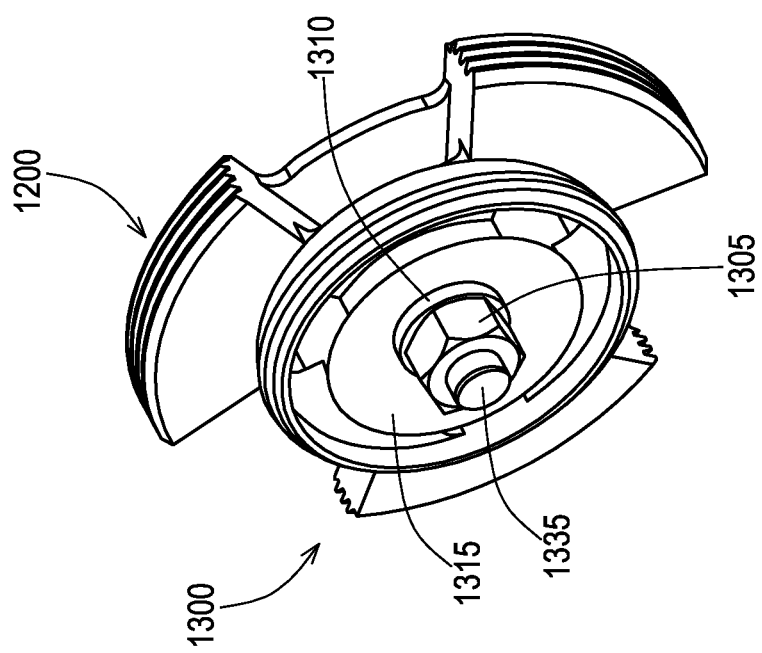
FIG. 14 is a perspective view of the exemplary valve block assembly of FIG. 13 as assembled in accordance with an embodiment of the invention.

In an embodiment, alternative valve block 1200 may be assembled with shim plates (somewhat similar to those used with valve block 74) that provide degrees of flow resistance. FIG. 13 is an exploded view of an exemplary valve block assembly 1300 using the alternative valve block 1200 and shows further details of exemplary shim plates used with alternative valve block 1200. Referring now to FIG. 13, the exploded view illustrates alternative valve block 1200 sandwiched by a top shim plate 1315 and a bottom shim plate 1325. A fastener 1335 may be threaded through a center of washer 1330, bottom shim plate 1325, valve block 1200 (through fastener aperture 1220), top shim plate 1315, and washer 1310. As such, hex nut 1305 may be engaged on fastener 1335 to hold the assembly 1300 together. FIG. 14 is a perspective view of the exemplary valve block assembly 1300 of FIG. 13 as assembled.

Those skilled in the art will appreciate that, as assembled, top shim plate 1315 restricts flow relative to throughholes 1230a-1230c, but does not restrict flow relative to throughholes 1215a-1215c given the extension of throughholes 1215a-1215c beyond the diameter of top shim plate 1315 and the presence of annular recessed channel 1246. And, as assembled, bottom shim plate 1325 restricts flow relative to throughholes 1215a-1215c as shown in FIG. 12D given bottom shim plate 1325 has a diameter large enough to cover throughholes 1215a-1215d but not so large as to restrict flow relative to cutout vent passageways 1225a-1225c, which also respectively connect to throughholes 1230a-1230c.

In operation, those skilled in the art will appreciate that during compression of an embodiment of shock 10 using alternative valve block assembly 1300, bottom shim plate 1325 prevents flow in throughholes 1215a-1215c, while flow is allowed through cutout vent passageways 1225a-1225c and allowed in throughholes 1230a-1230c as restricted by a flexing top shim plate 1315. However, during expansion or extension of this embodiment of shock 10, top shim plate 1315 no longer flexes open and operates to prevent flow in throughholes 1230a-1230b, while flow is allowed through cutout vent passageways 1225a-1225c and in throughholes 1215a-1215c as restricted by a flexing bottom shim plate 1325.

Additional embodiments illustrate further examples of structure that allows for external adjustment and control of an embodiment of the springless shock absorber 10. While FIG. 8 shows an embodiment of an externally adjustable valve block, FIGS. 15-18 show further embodiments using an alternative externally adjustable valve block.

Figure 15:
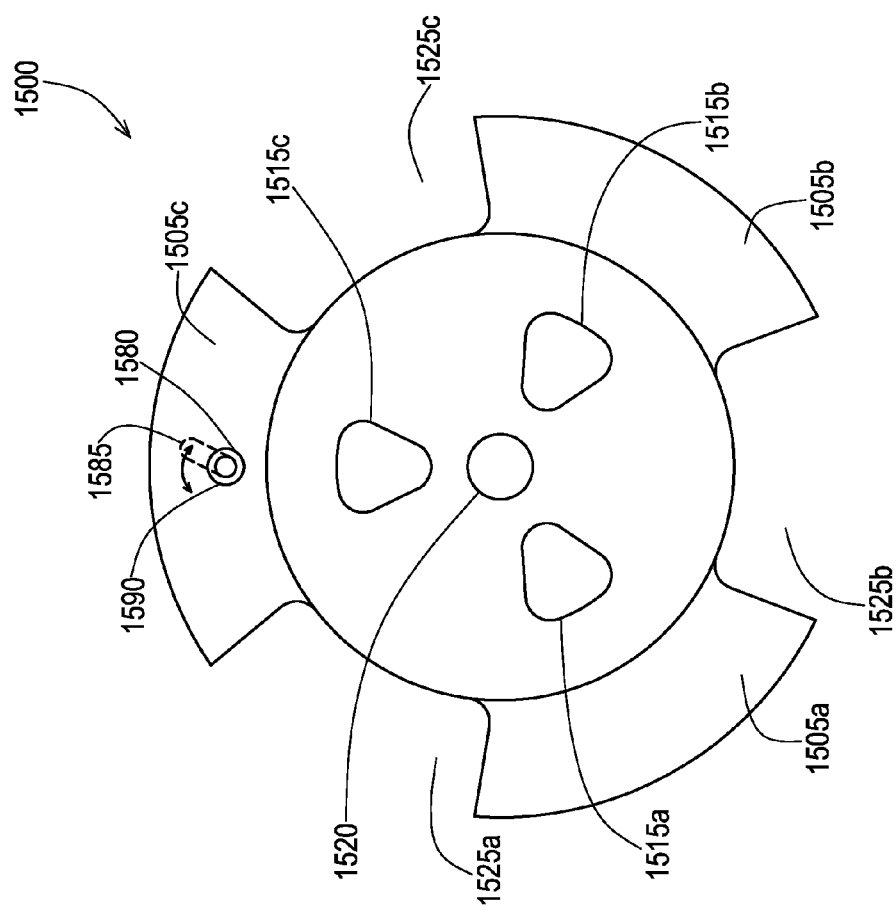
FIG. 15 is a bottom view of the alternative valve block of FIG. 12A that includes an exemplary adjustment aperture in accordance with an embodiment of the invention.

FIG. 15 is a bottom view of the alternative valve block of FIG. 12A that includes an exemplary adjustment aperture in accordance with an embodiment of the invention. Referring now to FIG. 15, alternative valve block 1500 is shown with features similar to those of valve block 1200. In addition, valve block 1500 includes an exemplary adjustment aperture 1580 disposed on a peripheral flanged portion 1505c of valve block 1500. The adjustment aperture 1580 provides an opening in the peripheral flanged portion 1505c through which adjustment structure may be disposed to effect changes in how fluid flows through throughholes and passageways of valve block 1500. In one example, the adjustment structure may comprise a shaft 1590 and adjuster arm 1585, which may be articulated (e.g., rotated) in response to rotation of the shaft 1590. This exemplary adjustment structure may be accessible from external to shock 10 so that a user may manipulate one end of shaft 1590 external to the shock 10 while the other end of shaft 1590 causes the adjuster arm 1585 to move internal to the shock 10. As shown in more detail in the example embodiments of FIGS. 16-18, this internal movement may translate into movement of structure (such as discs) that may adjustably provide degrees of flow resistance and, in some embodiments, provide different adjustments for each of compression-related flow resistance within the valve block and rebound-related flow resistance within the valve block.

Figure 16:
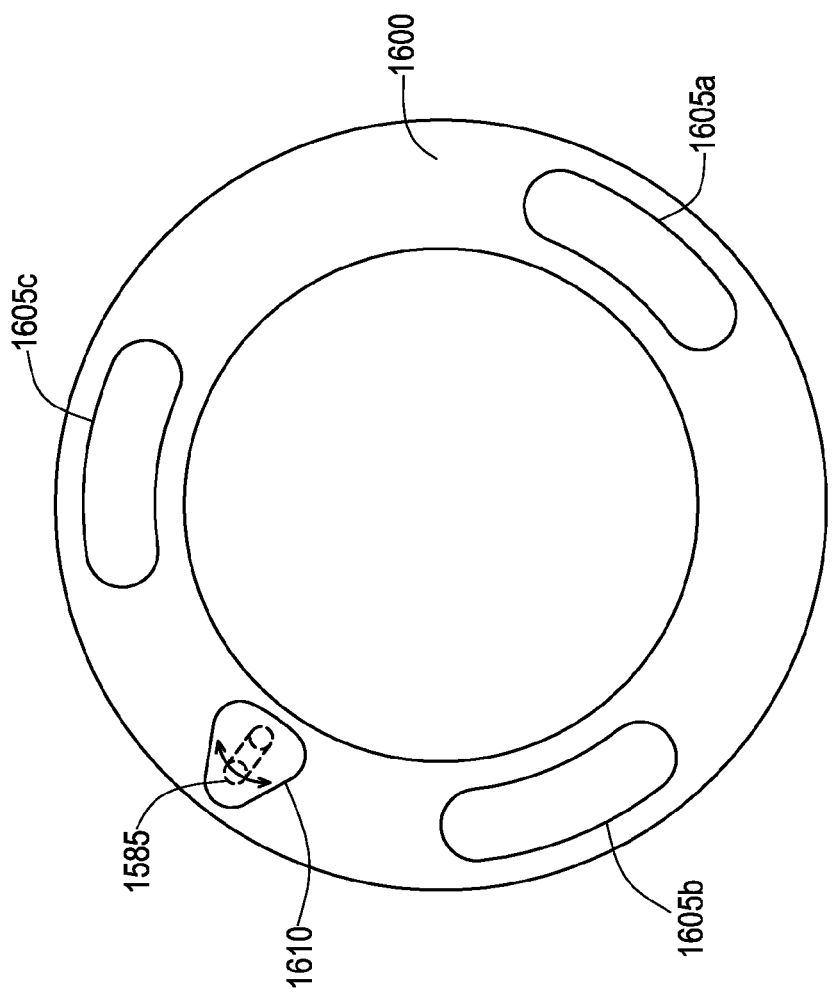
FIG. 16 is a diagram illustrating an exemplary top compression disc ring in accordance with an embodiment of the invention.
Figure 17:
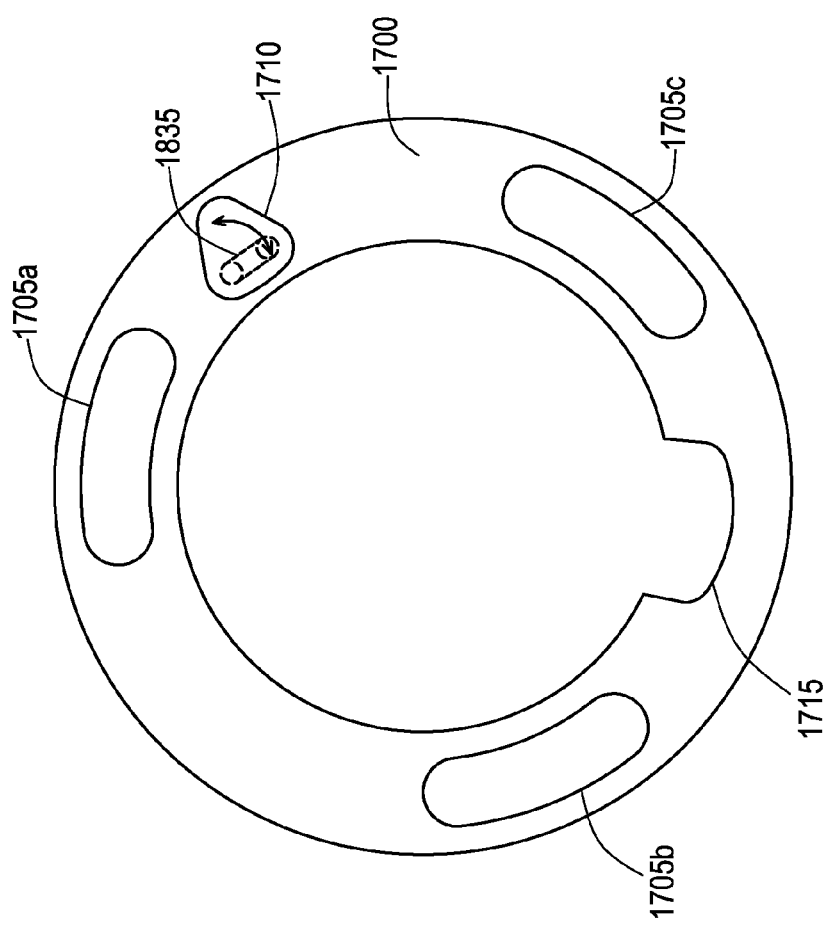
FIG. 17 is a diagram illustrating an exemplary bottom rebound disc ring in accordance with an embodiment of the invention.
Figure 18:
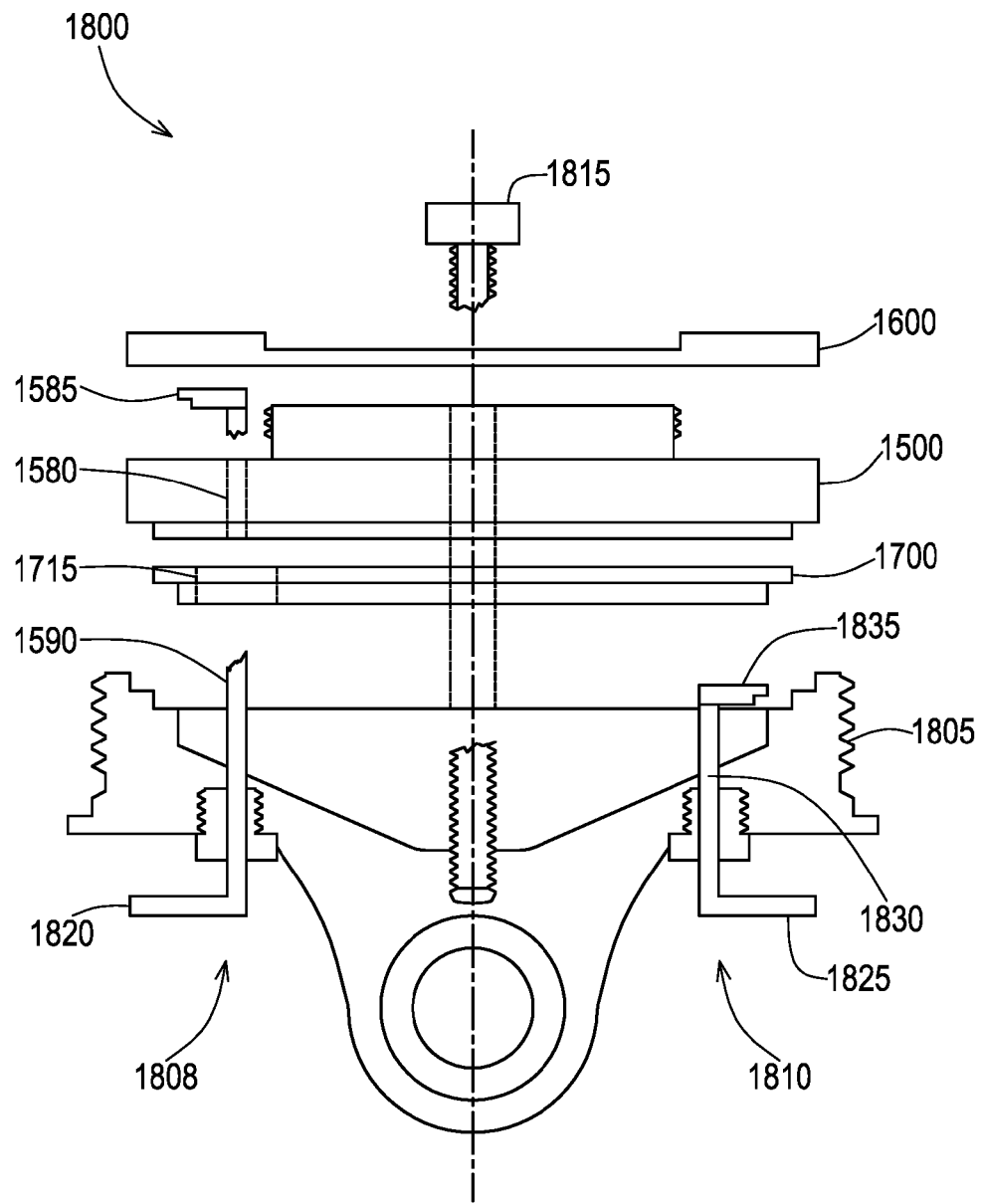
FIG. 18 is an exploded view of an exemplary externally adjustable valve block assembly using compression and rebound disc rings and the alternative valve block shown in FIG. 15 in accordance with an embodiment of the invention.

More specifically, FIGS. 16-18 illustrate exemplary embodiments of disc rings that may be used with alternative valve block 1500 as part of an exemplary valve block assembly to provide externally adjustable and selective flow resistance within a shock 10 (e.g., individually selectable flow resistance within cutout vent passageways of valve block 1500). In more detail, FIG. 16 is a diagram illustrating an exemplary top compression disc ring 1600, which includes several annular apertures 1605a-1605c through the ring 1600. Each of the annular apertures 1605a-1605c may align with respective ones of the cutout vent passageways of the valve block (such as cutout vent passageways of valve block 1500), but adjustable changes in the alignment of such apertures relative to the cutout vent passageways may allow for further selective adjustment of flow resistance relative to the cutout vent passageways.

To control how the respective alignment may be changed and, as a result, how the flow resistance in the valve block may be changed, top compression disc ring 1600 further includes an adjustment slot 1610. In general, the adjustment slot 1610 is configured to have adjuster arm 1585 disposed within it where movement of the adjuster arm 1585 causes a desired adjustment of relative orientation of the top compression disc ring 1600. In a more detailed embodiment, the adjustment slot 1610 is shaped such that rotation of the adjuster arm 1585 (e.g., via shaft 1590) causes a distal tip of adjuster arm 1585 to swing relative to shaft 1590 so that the distal tip engages an interior aperture wall surface of adjustment slot 1610 in order to apply force to that surface. As shown in FIG. 16, the exemplary adjustment slot 1610 is triangular shaped and the adjuster arm 1585 operates as a cam-like structure attached to a fixed shaft 1590 that twists to rotatably articulate the top compression disc ring 1600. In other words, angular movement of the adjuster arm in one direction or the other within adjustment slot 1610 causes the top compression disc ring 1600 to rotate and change the alignment between the annular apertures 1605a-1605c and the cutout vent passageways (or other throughholes of a valve block). As a result, flow resistance through the valve block may be adjustably restricted or opened back up via external articulation of the adjuster arm 1585 via shaft 1590.

While the top compression disc ring may be place on top of valve block 1500, a rebound disc ring may be placed on the opposing side of valve block 1500 to effect further selective adjustment of flow resistance through the valve block. FIG. 17 is a diagram illustrating an exemplary bottom rebound disc ring 1700 in accordance with an embodiment of the invention. As shown in FIG. 17, bottom rebound disc ring 1700 includes several annular apertures 1705a-1705c through the ring 1700. Each of the annular apertures 1705a-1705c may align with respective ones of the cutout vent passageways of the valve block (such as cutout vent passageways of valve block 1500), but adjustable changes in the alignment of such apertures relative to the cutout vent passageways may allow for further selective adjustment of flow resistance relative to the cutout vent passageways.

Like top compression disc ring 1600, bottom rebound disc ring 1700 includes an adjustment slot 1710 used to adjust for rebound-related flow resistance. As such, a separate adjuster arm 1835 may be disposed within slot 1710 and articulate similar to that described above with slot 1610. Bottom rebound disc ring 1700 further includes a clearance slot 1715 to accommodate adjustment structure (e.g., shaft 1590) used to separately articulate the top compression disc ring 1600.

When assembled together with a valve block (such as valve block 1500 having features similar to that of alternative valve block 1200 along with the adjustment aperture 1580) and adjustment elements (such as shafts and adjuster arms), the top compression and bottom rebound discs may be part of another embodiment of an externally adjusted valve block assembly that may be used as part of an embodiment of shock 10. FIG. 18 is an exploded view of an exemplary externally adjustable valve block assembly 1800 using compression and rebound disc rings, adjustment elements, and the alternative valve block shown in FIG. 15 in accordance with an embodiment of the invention. As shown in FIG. 18, valve block assembly 1800 comprises an exemplary bottom eyelet 1805 that receives bottom rebound disc ring 1700, valve block 1500, and top compression disc ring 1600. The bottom rebound disc ring 1700, valve block 1500, and top compression disc ring 1600 are collectively secured to the bottom eyelet 1805 by fastener 1815. As such and in this configuration, valve block 1500 is effectively sandwiched by top compression disc ring 1600 disposed above valve block 1500 and bottom rebound disc ring 1700 disposed below valve block 1500. As ring 1600, valve block 1500, and ring 1700 are assembled, these elements may be oriented with respect to each other such that clearance slot 1715, aperture 1580, and adjustment slot 1610 are aligned.

In this manner, a compression adjuster 1808 may be disposed through bottom eyelet 1805, clearance slot 1715 and aperture 1580 so that an internal end of the adjuster 1808 fits above valve block and within compression adjustment slot 1610 while an external end of the adjuster 1808 is exposed outside of bottom eyelet 1805. In more detail, an embodiment of compression adjuster 1808 may comprise a shaft (such as shaft 1590) having one end disposed within the shock 10 and the other end exposed outside the eyelet 1805. The end of the shaft 1590 disposed within the shock 10 may be secured to adjustment arm 1585, which may be a type of cam or lever structure that extends out from the shaft 1590 to cause articulated movement of the compression disc ring 1600 upon rotation of the shaft 1590. The end of the shaft exposed outside of eyelet 1805 may be connected to an external adjustment actuator 1820, which may be a lever, handle, knob, or other articulating structure that is operative to rotate shaft 1590. Those skilled in the art will appreciate that adjuster 1808 may be sealed with respect to its shaft so that fluid does not leak out of eyelet 1805.

In a somewhat similar fashion, a rebound adjuster 1810 may be disposed through bottom eyelet 1805 so that an internal end of the adjuster 1810 fits within rebound adjustment slot 1710 while an external end of the adjuster 1810 is exposed outside of bottom eyelet 1805. In more detail, an embodiment of rebound adjuster 1810 may comprise a shaft (such as shaft 1830) having one end disposed within the shock 10 just under the valve block 1500 while the other end exposed outside the eyelet 1805. The end of the shaft 1830 disposed within the shock 10 may be secured to rebound adjustment arm 1835, which may be a type of cam or lever structure that extends out from the shaft 1830 to cause articulated movement of the rebound disc ring 1700 upon rotation of the shaft 1830. The end of the shaft exposed outside of eyelet 1805 may be connected to an external adjustment actuator 1825, which may be a lever, handle, knob, or other articulating structure that is operative to rotate shaft 1830. Those skilled in the art will appreciate that rebound adjuster 1810, like compression adjuster 1808, may be sealed with respect to its shaft so that fluid does not leak out of eyelet 1805.

It will be recognized by those skilled in the art that various combinations of the preferred and alternate embodiments may selectively be utilized, wherein features of one embodiment may be incorporated into another embodiment via similar structural components.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. An improved valve block for use in a shock absorbing apparatus, the valve block comprising:
    a central valve block portion having a top surface and a bottom surface;
    a plurality of peripherally separated flanged portions each having radial side surfaces and an outer peripheral edge, wherein each of the peripherally separated flanged portions are fixed to the central valve block portion and rigidly extend outward from the central valve block portion and include threads on the outer peripheral edge of the peripherally separated flanged portion, and wherein opposing radial side surfaces of adjacent ones of the peripherally separated flanged portions and a cylindrical part of the central valve block portion define a plurality of peripherally disposed cutout vent passageways that allow axial fluid flow outside of the central valve block portion and between each of the adjacent ones of the peripherally separated flanged portions;
    a plurality of expansion throughholes disposed in the central valve block portion, wherein each of the expansion throughholes are disposed in an axial orientation from the top surface to the bottom surface of the central valve block portion to allow flow through the valve block during expansion of the shock absorbing apparatus; and
    a plurality of compression throughholes disposed in the central valve block portion, wherein each of the compression throughholes comprises an internal angular passageway from the top surface of the central valve block portion to one of the cutout vent passageways to allow flow through the valve block and the cutout vent passageways during compression of the shock absorbing apparatus.

2. The improved valve block of claim 1, wherein the central valve block portion includes inner threads along a cylindrical part of the central valve block portion.

3. The improved valve block of claim 1, wherein the internal angular passageway of each of the compression throughholes comprises at least an first compression passageway and a second compression passageway, wherein the first compression passageway extends from the top surface of the central valve block portion and axially into the central valve block portion to connect with the second compression passageway, wherein the second compression passageway connects with the first compression passageway within the central valve block portion and radially extends out from a central axis of the central valve block portion to connect with a respective one of the cutout vent passageways.

4. The improved valve block of claim 1, wherein an outermost point of the expansion throughholes on the top surface relative to a central axis of the central valve block portion is radially further away from the central axis when compared to an outermost point of the compression throughholes on the top surface relative to the central axis.

5. The improved valve block of claim 4, wherein an outermost point of the expansion throughholes on the bottom surface relative to the central axis is radially closer to the central axis than an innermost surface of the cutout vent passageways.

6. The improved valve block of claim 1 further comprising an annular recessed channel disposed along the top surface of the central valve block portion, wherein the annular recessed channel provides a channel for flow going into and out of the expansion throughholes near the top surface of the central valve block portion.

7. The improved valve block of claim 1 further comprising:
   a top shim plate attached to the top surface of the central valve block portion at a center axis point of the central valve block portion, the top shim plate having a first diameter that is large enough so that the top shim plate restricts flow through the compression throughholes but not so large as to restrict flow through the expansion throughholes; and
   a bottom shim plate attached to the bottom surface of the central valve block portion at the center axis point, the bottom shim plate having a second diameter large enough to cover the expansion throughholes but not so large as to cover the cutout vent passageways connected to the compression throughholes.

8. The improved block of claim 7, wherein during compression of the shock absorbing apparatus, the bottom shim plate prevents flow in the expansion throughholes while flow is allowed through the cutout vent passageways and allowed through the compression throughholes as restricted by flexing of the top shim plate; and
   wherein during expansion of the shock absorbing apparatus, the top shim plate prevents flow in the compression throughholes while flow is allowed through cutout vent passageways and allowed through the expansion throughholes as restricted by flexing of the bottom shim plate.

9. An improved springless shock absorbing and suspension apparatus comprising:
   an inner tubular section comprising a first fluid chamber and a second fluid chamber therewithin, wherein said first fluid chamber contains gas and wherein said second fluid chamber contains oil;
   a floating piston disposed within said inner tubular section between said first fluid chamber and said second fluid chamber;
   an outer tubular section having a first and second end, wherein the first end of the outer tubular section is at least partially disposed around at least a portion of the inner tubular section, wherein said outer tubular section comprises a fourth fluid chamber therewithin that contains oil;
   a valve block fixedly secured to the second end of the outer tubular section, the valve block further comprising,
      a central portion of the valve block, the central portion having a top surface, a bottom surface, and first threads disposed along a first peripheral part of the central portion;
      a plurality of peripherally separated flanged portions each having radial side surfaces and an outer peripheral edge, wherein each of the peripherally separated flanged portions are fixed to the central portion of the valve block and rigidly extend outward from the central portion and wherein opposing radial side surfaces of adjacent ones of the peripherally separated flanged portions and a cylindrical part of the central valve block portion define a plurality of peripherally disposed cutout vent passageways that allow axial fluid flow outside of the central valve block portion and between each of the adjacent ones of the peripherally separated flanged portions, wherein each of the separated peripheral flanged portions of the valve block having second threads along an outer peripheral edge of each of the separated peripheral flanged portions, the second threads for engaging with the second end of the outer tubular section;
      a plurality of expansion throughholes disposed in the central portion of the valve block, wherein each of the expansion throughholes are disposed in an axial orientiation from the top surface of the central portion to the bottom surface of the central portion to allow flow through the valve block during expansion of the shock absorbing apparatus; and
      a plurality of compression throughholes disposed in the central portion, wherein each of the compression throughholes comprises an internal angular passageway from the top surface of the central valve block portion to a one of the cutout vent passageways to allow flow through the valve block and the cutout vent passageways during compression of the shock absorbing apparatus; and
   a stationary tubular section disposed within the outer tubular section, the stationary tubular section fixedly secured to the first threads on first peripheral part of the central portion of the valve block, the stationary tubular section having a third fluid chamber therewithin.

10. The improved springless shock absorbing and suspension apparatus of claim 9, wherein the internal angular passageway of each of the compression throughholes in the valve block comprises:
   a first compression passageway; and
   a second compression passageway;
   wherein the first compression passageway extends from the top surface of the central portion and axially into the central portion to connect with the second compression passageway; and
   wherein the second compression passageway connects with the first compression passageway within the central portion and radially extends out from a central axis of the central portion to connect with one of the cutout vent passageways.

11. The improved springless shock absorbing and suspension apparatus of claim 9, wherein the valve block further comprises an annular recessed channel disposed along the top surface of the central portion, wherein the annular recessed channel provides a channel for flow going into and out of the expansion throughholes near the top surface of the central portion.

12. The improved springless shock absorbing and suspension apparatus of claim 9, wherein the valve block further comprises:
   a top shim plate attached to the top surface of the central portion at a center axis point of the central portion, the top shim plate having a first diameter that is large enough so that the top shim plate restricts flow through the compression throughholes but not so large as to restrict flow through the expansion throughholes; and
   a bottom shim plate attached to the bottom surface of the central portion at the center axis point, the bottom shim plate having a second diameter large enough to cover the expansion throughholes but not so large as to cover the cutout vent passageways connected to the compression throughholes.

13. The improved springless shock absorbing and suspension apparatus of claim 12, wherein during compression of the shock absorbing apparatus, the bottom shim plate prevents flow in the expansion throughholes while flow is allowed through the cutout vent passageways and allowed through the compression throughholes as restricted by flexing of the top shim plate; and
   wherein during expansion of the shock absorbing apparatus, the top shim plate prevents flow in the compression throughholes while flow is allowed through cutout vent passageways and allowed through the expansion throughholes as restricted by flexing of the bottom shim plate.

14. An adjustable valve block assembly for a shock absorbing apparatus, the assembly comprising:
   a valve block further comprising,
      a central portion of the valve block, the central portion having top surface, a bottom surface, and first threads disposed along a first peripheral part of the central portion,
      a plurality of peripherally separated flanged portions each having radial side surfaces and an outer peripheral edge, wherein each of the peripherally separated flanged portions are fixed to the central portion of the valve block and rigidly extend outward from the central portion and wherein opposing radial side surfaces of adjacent ones of the peripherally separated flanged portions and a cylindrical part of the central valve block portion define a plurality of peripherally disposed cutout vent passageways that allow axial fluid flow outside of the central valve block portion and between each of the adjacent ones of the peripherally separated flanged portions, wherein each of the peripherally separated flanged portions of the valve block having second threads along an outer peripheral edge of each of the peripherally separated flanged portions, the second threads for engaging with the second end of the outer tubular section, and wherein one of the peripherally separated flanged portions having an adjustment aperture disposed outside the periphery of the central portion of the valve block,
      a plurality of expansion throughholes disposed in the central portion of the valve block, wherein each of the expansion throughholes are disposed in an axial orientiation from the top surface of the central portion to the bottom surface of the central portion to allow flow through the valve block during expansion of the shock absorbing apparatus, and
      a plurality of compression throughholes disposed in the central portion, wherein each of the compression throughholes comprises an internal angular passageway from the top surface of the central valve block portion to a one of the cutout vent passageways to allow flow through the valve block and the cutout vent passageways during compression of the shock absorbing apparatus;
   a disc ring concentrically disposed relative to the valve block to adjustably restrict flow through at least one of the cutout vent passageways, the disc ring comprising,
      an adjustment slot aligned with the adjustment aperture on the one of the peripheral flanged portions, the adjustment slot having an interior wall surface, and
      at least one annular flow aperture that adjustably aligns with at least a portion of the at least one of the cutout vent passageways to allow flow through combined disc ring and the at least one of the cutout vent passageways depending on the rotational alignment of the disc ring and the at least one of the cutout vent passageways; and
   an externally actuated flow control adjuster comprising
      an adjustment arm disposed within the adjustment slot of the disc ring,
      a shaft having one end coupled to the adjustment arm and a second end extending external of valve block and the shock absorbing apparatus, and
      an adjustment handle coupled to the second end of the shaft, wherein rotation of the adjustment handle responsively rotates the adjustment arm to apply a disc movement force to the interior wall surface of the disc ring and cause movement of the disc ring relative to the valve block that alters the rotational alignment of the disc ring and the at least one of the cutout vent passageways, the altered rotational alignment changing the flow through the at least one annular flow aperture of the disc ring and the at least one of the cutout vent passageways.

15. The adjustable valve block assembly of claim 14 further comprising an eyelet endpiece of the shock absorbing apparatus, wherein the valve block and the disc ring are collectively secured to an interior side of the eyelet, and the shaft of the externally actuated flow control adjuster is disposed through the eyelet with the adjustment handle being external to the eyelet.

16. The adjustable valve block assembly of claim 14, wherein the valve block further comprises:
   a top shim plate attached to the top surface of the central portion at a center axis point of the central portion, the top shim plate having a first diameter that is large enough so that the top shim plate restricts flow through the compression throughholes but not so large as to restrict flow through the expansion throughholes; and
   a bottom shim plate attached to the bottom surface of the central portion at the center axis point, the bottom shim plate having a second diameter large enough to cover the expansion throughholes but not so large as to cover the cutout vent passageways connected to the compression throughholes.

17. The adjustable valve block assembly of claim 14, wherein the internal angular passageway of each of the compression throughholes in the valve block comprises at least a first compression passageway and a second compression passageway, wherein the first compression passageway extends from the top surface of the central portion and axially into the central portion to connect with the second compression passageway, wherein the second compression passageway connects with the first compression passageway within the central portion and radially extends out from a central axis of the central portion to connect with a respective one of the cutout vent passageways of the valve block.

18. The adjustable valve block assembly of claim 14 further comprising an annular recessed channel disposed along the top surface of the central portion, wherein the annular recessed channel provides a channel for flow going into and out of the expansion throughholes near the top surface of the central portion.

\* \* \* \* \*